(12) United States Patent
Vlazny et al.

(10) Patent No.: US 8,128,485 B2
(45) Date of Patent: *Mar. 6, 2012

(54) SYSTEMS AND METHODS FOR ACCESSING, MANIPULATING AND USING FUNDS ASSOCIATED WITH LOTTERY-TYPE GAMES

(75) Inventors: Kenneth A. Vlazny, York, PA (US); Brendan Burgess, Poway, CA (US); Victor I. Harrison, Glen Rock, PA (US)

(73) Assignee: United Tote Company, Glen Rock, PA (US)

( * ) Notice: Subject to any disclaimer, the term of this patent is extended or adjusted under 35 U.S.C. 154(b) by 1469 days.

This patent is subject to a terminal disclaimer.

(21) Appl. No.: 11/223,217

(22) Filed: Sep. 9, 2005

(65) Prior Publication Data
US 2006/0052153 A1    Mar. 9, 2006

Related U.S. Application Data

(63) Continuation-in-part of application No. 10/731,701, filed on Dec. 8, 2003.

(51) Int. Cl.
*G06F 17/00* (2006.01)
(52) U.S. Cl. ............. 463/25; 463/26; 463/27; 463/28; 463/42
(58) Field of Classification Search .............. 463/25
See application file for complete search history.

(56) References Cited

U.S. PATENT DOCUMENTS

| | | |
|---|---|---|
| 3,909,002 A | 9/1975 | Levy |
| 4,322,612 A | 3/1982 | Lange |
| 4,669,730 A | 6/1987 | Small |
| 4,815,741 A * | 3/1989 | Small ............... 463/17 |
| 5,038,022 A | 8/1991 | Lucero |
| 5,265,874 A | 11/1993 | Dickinson et al. |
| 5,321,241 A | 6/1994 | Craine |

(Continued)

FOREIGN PATENT DOCUMENTS

WO    00/67215    11/2000

(Continued)

OTHER PUBLICATIONS

Account Wagering Services, Penn National Gaming, Inc. (visited Jan. 18, 2005) <http://www.pennbet.com/terms_conditions.html> (5 pages).

(Continued)

*Primary Examiner* — Ronald Laneau
*Assistant Examiner* — Justin Myhr
(74) *Attorney, Agent, or Firm* — TraskBritt

(57) ABSTRACT

Methods of lottery-type wagering are disclosed. One method utilizes a credit instrument associated with an account set up by a patron with a gaming administrator. The credit instrument may be used to place lottery-type wagers at a gaming terminal and, additionally, for the purchase of goods and/or services, accessing additional informational displays, or for other non-wagering purposes and/or areas associated with the gaming administrator or a venue offering lottery-type wagering. The credit instrument acts as a cash substitute wherein the patron's account may be automatically updated with all of the patron's wins, losses, and purchases via a network system or updated on the credit instrument. In other methods, lottery-type wagers are placed with an anonymous account such that an identity of a player is not known to the gaming administrator.

66 Claims, 10 Drawing Sheets

U.S. PATENT DOCUMENTS

| | | | |
|---|---|---|---|
| 5,324,035 A * | 6/1994 | Morris et al. | 463/42 |
| 5,457,306 A | 10/1995 | Lucero | |
| 5,476,259 A | 12/1995 | Weingardt | |
| 5,557,086 A | 9/1996 | Schulze et al. | |
| 5,559,312 A | 9/1996 | Lucero | |
| 5,770,533 A * | 6/1998 | Franchi | 463/42 |
| 5,779,547 A | 7/1998 | SoRelle et al. | |
| 5,800,268 A | 9/1998 | Molnick | |
| 5,806,045 A | 9/1998 | Biorge et al. | |
| 5,811,772 A * | 9/1998 | Lucero | 235/380 |
| 5,830,068 A | 11/1998 | Brenner et al. | |
| 5,839,956 A * | 11/1998 | Takemoto | 463/25 |
| 5,902,983 A | 5/1999 | Crevelt et al. | |
| 5,952,640 A | 9/1999 | Lucero | |
| 5,959,277 A | 9/1999 | Lucero | |
| 5,984,779 A | 11/1999 | Bridgeman et al. | |
| 6,099,406 A | 8/2000 | Demster | |
| 6,190,256 B1 | 2/2001 | Walker et al. | |
| 6,307,956 B1 | 10/2001 | Black | |
| 6,331,148 B1 | 12/2001 | Krause et al. | |
| 6,347,738 B1 | 2/2002 | Crevelt et al. | |
| 6,379,248 B1 | 4/2002 | Jorasch et al. | |
| 6,383,074 B1 | 5/2002 | Boggs | |
| 6,390,917 B1 * | 5/2002 | Walker et al. | 463/20 |
| 6,394,907 B1 | 5/2002 | Rowe | |
| 6,450,887 B1 | 9/2002 | Mir et al. | |
| 6,508,710 B1 | 1/2003 | Paravia et al. | |
| 6,511,377 B1 * | 1/2003 | Weiss | 463/25 |
| 6,547,131 B1 | 4/2003 | Foodman et al. | |
| 6,558,255 B2 | 5/2003 | Walker et al. | |
| 6,607,441 B1 | 8/2003 | Acres | |
| 6,634,946 B1 | 10/2003 | Bridgeman | |
| 6,652,380 B1 * | 11/2003 | Luciano | 463/25 |
| 6,702,676 B1 | 3/2004 | Ota et al. | |
| 6,722,980 B2 | 4/2004 | Stronach | |
| 6,736,322 B2 | 5/2004 | Gobburu et al. | |
| 6,811,488 B2 | 11/2004 | Paravia et al. | |
| 6,830,514 B2 | 12/2004 | Meyer et al. | |
| 7,225,316 B2 | 5/2007 | Thadani | |
| 7,300,353 B2 | 11/2007 | Goto et al. | |
| 2001/0051540 A1 | 12/2001 | Hindman et al. | |
| 2002/0028708 A1 * | 3/2002 | Busch et al. | 463/42 |
| 2002/0065566 A1 | 5/2002 | Aronson et al. | |
| 2002/0094858 A1 | 7/2002 | Yacenda | |
| 2002/0098883 A1 | 7/2002 | Packes, Jr. et al. | |
| 2002/0111213 A1 | 8/2002 | McEntee et al. | |
| 2002/0177483 A1 | 11/2002 | Cannon | |
| 2003/0036425 A1 | 2/2003 | Kaminkow et al. | |
| 2003/0078094 A1 | 4/2003 | Gatto et al. | |
| 2003/0092478 A1 | 5/2003 | Weil | |
| 2003/0171145 A1 | 9/2003 | Rowe | |
| 2003/0228907 A1 * | 12/2003 | Gatto et al. | 463/42 |
| 2003/0228910 A1 | 12/2003 | Jawaharlal et al. | |
| 2004/0014514 A1 | 1/2004 | Yacenda | |
| 2004/0029630 A1 | 2/2004 | Walker et al. | |
| 2004/0036212 A1 | 2/2004 | Walker et al. | |
| 2004/0082384 A1 * | 4/2004 | Walker et al. | 463/40 |
| 2004/0087360 A1 | 5/2004 | Chamberlain et al. | |
| 2004/0111358 A1 | 6/2004 | Lange et al. | |
| 2004/0204233 A1 * | 10/2004 | Saffari et al. | 463/25 |
| 2004/0209674 A1 | 10/2004 | Conover et al. | |
| 2004/0229671 A1 | 11/2004 | Stronach et al. | |
| 2004/0235503 A1 | 11/2004 | Koponen et al. | |
| 2005/0026697 A1 | 2/2005 | Balahura et al. | |
| 2008/0085763 A1 | 4/2008 | Randhawa | |
| 2008/0102957 A1 | 5/2008 | Burman et al. | |
| 2008/0153583 A1 | 6/2008 | Huntley et al. | |
| 2009/0042631 A1 | 2/2009 | Randhawa | |
| 2009/0090923 A1 | 4/2009 | Murayama | |
| 2009/0093292 A1 | 4/2009 | Randhawa | |
| 2009/0280886 A1 | 11/2009 | Randhawa | |

FOREIGN PATENT DOCUMENTS

| | | |
|---|---|---|
| WO | 02/38233 A1 | 5/2002 |
| WO | 03/073386 A2 | 9/2003 |
| WO | 03/090139 A1 | 10/2003 |
| WO | WO 03/104972 A1 | 12/2003 |
| WO | WO/2004/092993 A1 | 10/2004 |

OTHER PUBLICATIONS

Colorado Lottery, https://www.coloradolotterycom/mylottery/login.cfm (visited Sep. 9, 2004).

International Search Report dated Aug. 2, 2007, for International Application No. PCT/US06/08239 (2 pages).

NYRA ONA Account Membership Kit, www.nyra.com, Published Jun. 2004, retrieved Jun. 2008, pp. 1-13.

Players' Choice Club Racing Membership Application (visited Jan. 18, 2005) <http://www.pennbet.com> (2 pages).

The Starbucks Card Duetto™ Visa®, http://www.stabucks.com/card/duetto.asp?cookie%5Ftest=1, Dec. 2, 2003, 1 page.

International Search Report for International Application No. PCT/US06/34550 mailed Jul. 21, 2008.

* cited by examiner

SYSTEMS AND METHODS FOR ACCESSING, MANIPULATING AND USING FUNDS ASSOCIATED WITH LOTTERY-TYPE GAMES

CROSS-REFERENCE TO RELATED APPLICATIONS

This application is a continuation-in-part of pending U.S. patent application Ser. No. 10/731,701, filed Dec. 8, 2003, the disclosure of which is incorporated in its entirety herein by this reference.

This application is also related to U.S. patent application Ser. No. 11/083,792, filed Mar. 17, 2005, now U.S. Pat. No. 7,749,078, issued Jul. 6, 2010, which is also a continuation-in-part of pending U.S. patent application Ser. No. 10/731,701, filed Dec. 8, 2003.

BACKGROUND OF THE INVENTION

1. Field of the Invention

The present invention relates to systems and methods for accessing, manipulating and using funds associated with a lottery-type game. More specifically, the present invention relates to systems and methods of accessing funds using a credit instrument in order to place a lottery-type wager and, optionally, the use of such funds for the purchase of goods, services or both at a wagering establishment.

2. State of the Art

Various conventional lottery-type games allow a player to select one or more groups of numbers to match with a group of numbers generated by a gaming administrator, which may include, for example, a gaming administrator, gaming authority or some other gaming operator. For example, gaming administrators offer lottery-type games, sometimes referred to as "Pick-3," in which a player selects three numbers to match identically with a set of three numbers generated by the gaming administrator. Another example of a lottery-type game is POWERBALL®, offered by many states.

In conventional lottery-type games, typically the player is required not only to match the numbers, but also to match the order in which the numbers are generated. For instance, if a player were to select the number group "123" and the numbers generated in a drawing of the lottery-type game were "213", the play would not be considered a winning outcome even though the player had correctly matched the three numbers because the order of the concatenated string of numbers was not matched. Generally, the size of the payout for a winning play is balanced with the quantity of numbers the player must match to produce a winning outcome. For example, if the gaming administrator offers a high payout, it generally requires the player to match 6 or 7 numbers. Thus, in a conventional lottery-type game, the odds of a player winning a jackpot prize other than a relatively small amount of money in a secondary prize are fairly rare, and the player may lose an incentive to keep playing. These high payout lottery-type games typically produce very few winners, often causing players to lose interest in the game.

A player typically purchases a lottery-type wager by going to an establishment that offers lottery-type gaming and purchasing the lottery-type wager from a teller or employee operated gaming terminal located at the establishment. Typically, to make a lottery-type wager, a cash purchase method is used where the player pays cash to purchase the lottery ticket. However, with the cash purchase method, there is no record of the identity of the player that actually purchased the lottery ticket. In essence, the lottery ticket is a bearer instrument.

Although the wagered funds and selected numbers are stored or tracked in a lottery-type game computer system operatively connected to the gaming terminal and a lottery-type game ticket is issued to the player who purchased the lottery-type game wager, no record of the identity of the player is established, which results in risks to the player holding the lottery ticket. For instance, if the lottery ticket is lost or accidentally destroyed, the bearer instrument nature of the ticket may result in the player losing the opportunity to cash the ticket. For instance, should the player lose their lottery-type game ticket that evidences the purchase of the lottery-type wager, the player loses their opportunity to collect their winnings, resulting in an unfair transaction. Other risks of the bearer instrument nature of the lottery ticket include the possibility of a dispute revolving around a player claiming, but not able to prove, to have purchased a winning ticket. Further, since the lottery ticket is in essence an anonymous bearer instrument, the gaming establishment is unable to offer any type of rewards program along with the lottery tickets. These drawbacks of conventional lottery tickets result in player dissatisfaction, unnecessary expense and inconvenience associated with administrative and/or legal hearings, and unwanted negative press for lottery administrators.

Thus, a need exists for a method and system for associating a player's lottery-type game wagering activities with the player while maintaining the anonymity of the player, a feature that is preferred by many patrons who seek confidentiality in their wagering transactions. Further, since few players win a substantial amount of money in lottery-type wages, a need exists for methods and systems of lottery-type wagering that provide players with a bonus or other incentive to make the lottery-type wagers.

BRIEF SUMMARY OF THE INVENTION

In each of its various embodiments, the present invention encompasses methods and systems of lottery-type gaming that overcome the drawbacks of conventional lottery-type systems. The various embodiments are non-limiting examples of the present invention.

In one embodiment, a method of lottery-type wagering includes providing a gaming terminal configured for a player to place a lottery-type wager and providing a player an opportunity to place funds in an anonymous account. The player is enabled to access a portion of the funds of the anonymous account for use at the gaming terminal and the player is enabled to place a lottery-type wager at the gaming terminal on a lottery-type game using the portion of the funds of the anonymous account.

A method of conducting a lottery-type gaming activity is disclosed in another embodiment. The method includes providing a gaming terminal associated with a device for reading a credit instrument and providing a player an opportunity to associate an anonymous account having a monetary value with the credit instrument, wherein the credit instrument is readable by the device for reading the credit instrument. The method also includes providing the player additional opportunities to place lottery-type wagers on a lottery-type gaming activity using the credit instrument and the gaming terminal.

In another embodiment, a method of conducting a lottery-type gaming activity includes enabling a player to associate a credit instrument with an account of a financial institution and with an account of a lottery-type gaming system. The player is further enabled to transfer funds between the account of the financial institution and the account of the lottery-type gaming system. Subsequent to a transfer of such funds, the player is enabled to place a lottery-type wager with funds associated with the account of the lottery-type gaming system using the credit instrument. As a consequence, only a single transaction fee may be incurred by the player, rather than incurring multiple transaction fees with the placement of each subsequent wager as may occur if wagering directly from the account of the financial institution. In this manner, saving incurred from reduced transaction fees may incentivize the player to place more bets.

In yet another embodiment, a cashless method of lottery-type wagering comprises providing a gaming terminal configured for a player to place a lottery-type wager, enabling the player to present a credit instrument associated with a monetary account to a card reader in communication with the gaming terminal, enabling the player to access at least a portion of funds of the monetary account for use at the gaming terminal, and enabling the player to place a lottery-type wager at the gaming terminal using the at least a portion of the finds.

In a further embodiment, a cashless method of lottery-type wagering includes inputting a unique identifier associated with a monetary account over a communication link with a remote computer, enabling a player to access at least a portion of funds from the monetary account, and enabling the player to place a lottery-type wager over the communication link on an event using the at least a portion of the funds.

In yet another embodiment, the present invention comprises a method of enabling cashless, lottery-type gaming wherein a credit instrument, whether anonymous or not, may be used to provide a tracking capability for use in incentive programs in which players may accumulate bonus points or prizes based upon purchases.

In still a further embodiment, the present invention comprises a method of lottery-type gaming wherein players are provided with tangible, yet anonymous, instruments for placing lottery-type wagers that are far more robust than conventional paper tickets.

The present invention also includes systems to implement the above-mentioned methods of lottery-type gaming.

Various features, advantages, and alternative aspects of the present invention will be readily apparent to those of ordinary skill in the art from a consideration of the following detailed description taken in combination with the accompanying drawings.

BRIEF DESCRIPTION OF THE SEVERAL VIEWS OF THE DRAWINGS

In the drawings, which illustrate what are currently considered to be the best modes for carrying out the invention.

DETAILED DESCRIPTION OF THE INVENTION

Figure 1A:
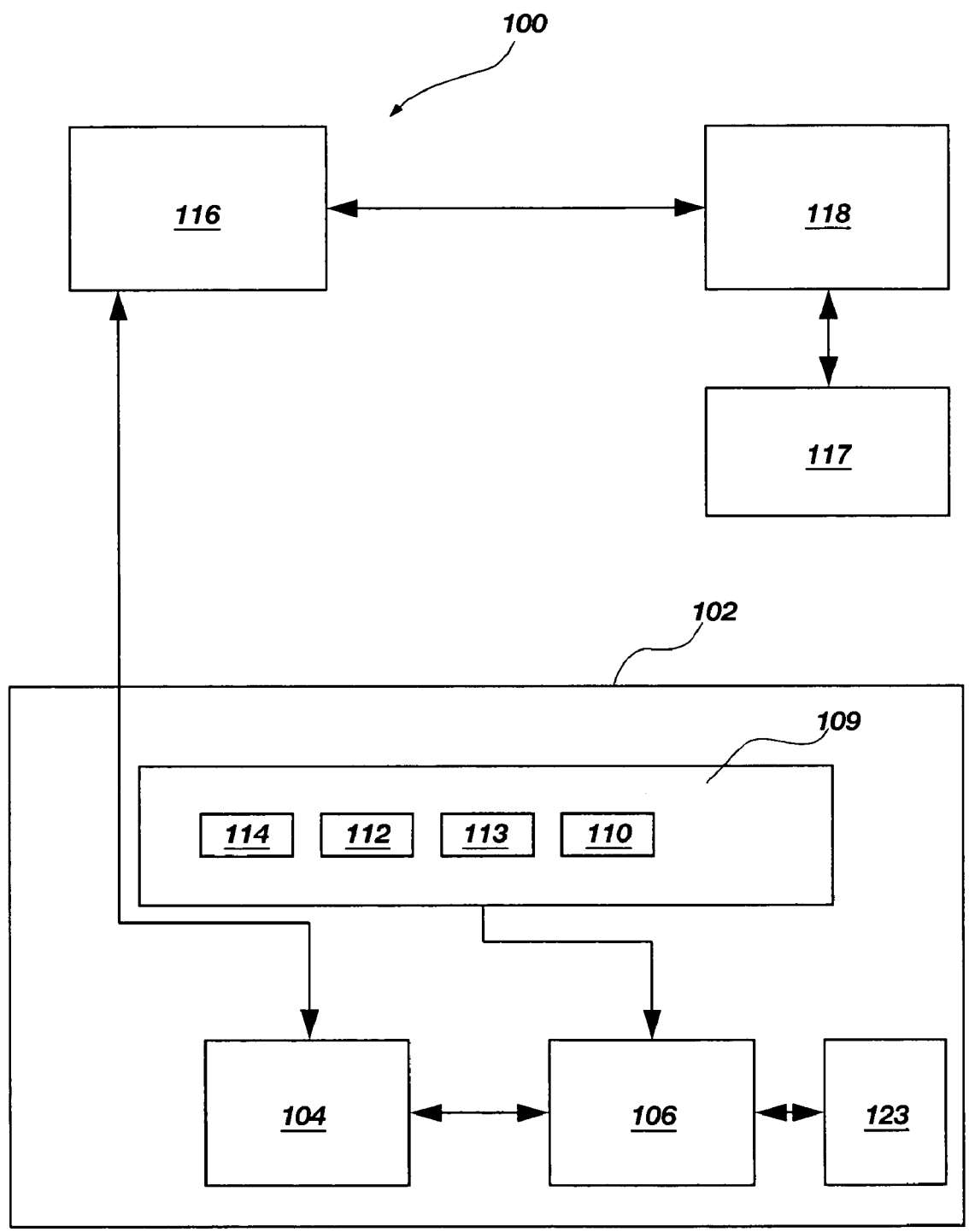
FIGS. 1A-1C are block diagrams of lottery-type gaming systems on which the lottery-type gaming methods of the present invention described in FIGS. 2A, 2B, and 3 may be implemented.

The present invention includes methods for cashless, lottery-type wagering at a gaming venue. In accordance with the present invention, lottery-type wagers may be placed anonymously using a credit instrument, an anonymous account or combinations thereof. As used herein, the term "credit instrument" may include or be associated with, without limitation, a house or "frequent-player" card such as a lottery-type gaming venue issued card, a credit card, a smart card, a debit card, a bank card, a token card, an anonymous token card, a voucher, a magnetic strip, a radio frequency identification transmitter, an ATM card, a smart card account, a combination house card/credit/debit card, a token/debit card, a stored value card, a bar code, any coded indicia, a pre-owned instrument (i.e., a VISA® card, a DISCOVER® card, a MASTERCARD® card, an AMERICAN EXPRESS® card, a STARBUCKS® card, a HOME DEPOT® card, an airline mileage program card, or a driver's license), a gift card, or combinations of any thereof. The credit instrument may have a pre-set amount of money that is purchased by the player such that as the player wins, more money may be placed on the credit instrument, wherein the money that is won can be transferred to another account. The "credit instrument" may also be used to refer to a device having a unique identifier including, but not limited to, a cell phone, a personal digital assistant (PDA), a virtual address associated with an individual, or any other electronic address. The present invention also includes using the credit instrument to access funds from an account associated with the credit instrument to place a lottery-type wager. The term "account" as used throughout this disclosure includes, but is not limited to, accounts such as credit card accounts, bank accounts associated with debit cards, personal checking accounts, and accounts set up with lottery-type gaming administrators.

In one embodiment, the patron is enabled to associate a credit instrument with an account in a system of a gaming administrator that offers lottery-type gaming. The credit instrument is associated with an account established by a player with the gaming administrator, contains information regarding the account recorded therein, and is reusable (i.e., the credit instrument may be used more than once each day and on more than one day). In various embodiments, the credit instrument may be associated with a 16-digit account number, a 4-digit default PIN (personal identification number) or a password, wherein the numbers may be printed on the back of or be associated with the credit instrument. The 4-digit PIN may have a film covering it that may easily be removed by scratching to reveal it. If a magnetic strip card is associated with the credit instrument, the magnetic strip may be encoded with the default PIN and when used for the first time the default PIN may be automatically entered in the system. The PIN may, subsequently, be changed by the player. Thus, the credit instrument may be configured as a bearer instrument (i.e., a cash substitute).

Allowing the player to associate a credit instrument with the purchase of a lottery-type wager enables the player to have a record of the transaction (i.e., the credit instrument) that is more durable than the lottery ticket, thus reducing the possibility of accidental destruction (e.g., running it through a washing machine). Further, the association of the credit instrument with the lottery-type wager would help resolve any possible dispute as to which player actually purchased a winning lottery-type wager, yet the player may still remain anonymous. For instance, the credit instrument could provide an audit trail, in that other lottery transactions may exist on the credit instrument to which the player could refer in order to help prove proof of ownership. Further, if the player opts to register the credit instrument with his/her name with the gaming establishment, then absolute proof of ownership may be established. Additionally, if a credit instrument were lost, the assets associated with the credit instrument and any pending lottery-type wagers may be "frozen" and subsequently reissued to the player by the gaming establishment upon the successful resolution of any verification.

In another embodiment, a player may deposit funds into an account associated with the credit instrument at staffed or self-serve terminals located at a venue offering lottery-type gaming using any number of vehicles, such as, for example, cash, check, debit/credit card charges, direct deposit, a transfer from an EFT system, among many others. If a venue does not desire to invest in PIN pads at staffed terminals, self-serve terminals may be used to issue vouchers for funds in the patron's account associated with the credit instrument that may be redeemed at a staffed terminal or mailed or presented in person to the gaming administrator for redemption. Funds from vouchers and winning lottery-type gaming tickets may be deposited into the account associated with the credit instrument at a staffed or self-serve terminal that reads the credit instrument. If the funds of the player's account associated with the credit instrument are depleted, the player may replenish them using any one or combination of the above methods. Also, the player's wins, losses, and expenditures may be automatically updated in the player's account by the gaming administrator. If the player's winnings qualify for withholding by a tax authority, such as the Internal Revenue Service (IRS), the winnings may be flagged by the gaming administrator and subsequently credited to the player's account upon completion of forms required by the tax authority.

The credit instrument may be used for placing lottery-type wagers and, optionally, for the purchase of products and/or services at the venue, for accessing additional betting screens, or special access areas (e.g., a clubhouse or skybox area at a stadium or track). Essentially, the credit instrument operates as or may be used like a cash substitute at the venue. If desired, a variety of graphics may be used on the credit instrument if the credit instrument is provided by the venue to assist with marketing as desired by the management of the venue.

Anonymous Lottery-Type Wagering

In another embodiment, the credit instrument may be associated with a so-called "anonymous" account in which the identity of the player is not known to the gaming administrator. For instance, the player may be provided with an opportunity to associate a credit instrument with an anonymous account of a lottery-type gaming system or set up an anonymous account using a gaming terminal of a lottery-type gaming system. In one embodiment, the player enters an identifying feature (i.e., an account number of a credit card) or scans the identifying feature (i.e., a magnetic strip of a debit card) of the credit instrument with a device capable of reading the credit instrument that is associated with a lottery-type gaming system. Once the credit instrument is identified by the lottery-type gaming system, an anonymous account associated with the lottery-type gaming system is established. The anonymous account may be identified by the lottery-type gaming system by a code or account number, and optionally encrypted, but the identity of the player who sets up the anonymous account is not readily available to the lottery-type gaming system, thus keeping the player anonymous. Once the anonymous account is established and the player has placed funds in the anonymous account, the player may place lottery-type wagers using the funds of the anonymous account. The funds of the anonymous account may also be used to purchase goods and/or services at a venue offering lottery-type gaming or at another venue suitably equipped to recognize and process transactions from the anonymous account. For security purposes, the player may also associate a password or a PIN number with the credit instrument such that in order to access funds of the anonymous account, the password or the PIN number must be entered to activate the anonymous account.

In another embodiment, the player may set up an anonymous account with a lottery-type gaming system without a credit instrument. For instance, the player may enter a unique identifier such as, for example, a username into a gaming terminal of a lottery-type gaming system, wherein the lottery-type gaming system associates and identifies the anonymous account with the unique identifier. In another embodiment, the unique identifier may be established with a biometric device such as, for example, a fingerprint scanner. In this manner, the player may deposit funds in the anonymous account, place lottery-type wagers and access the funds for other purposes (i.e., purchasing goods or services) even if the player does not have a credit instrument.

The use of an anonymous account and the ability to place lottery-type wagers appeals to players who are more likely to place lottery-type wagers if their gaming activities are anonymous. For instance, certain patrons may desire to keep their wagers confidential for cultural or religious reasons. Thus, an anonymous account associated with a credit instrument or another unique instrument may be established by a player. With the anonymous account, the player is not required to provide identifying information such as a social security number or name, and is not required to fill out an application. In one embodiment, the anonymous account may be set up at a self-service terminal and associated with the credit instrument, wherein the anonymous account may be accessed with the credit instrument or the unique identifier, and funds associated with the anonymous account may be used as cash. In this manner, the player is able to quickly set up the anonymous account and does not need to go to a special location at the gaming venue to fill out a lengthy application to obtain the credit instrument.

The association of the anonymous account with the credit instrument or the unique identifier has many security advantages over the use of cash or vouchers, in that the credit instrument may be protected with a security measure such as, for example, a PIN, any other access code, a password, or use of a biometric identifier. For instance, if the credit instrument is lost, someone who does not know the PIN, access code or password would not be able to access the funds in the anonymous account associated with the credit instrument or the unique identifier, unlike cash or a voucher, which, if lost, may be used by anyone that finds the cash or the voucher. Further, the anonymous account may be used to deter money laundering, in that, under federal mandates to help combat terrorism funding, an amount of money that people put into and take out of the anonymous account may be monitored and limited, and if unusual or suspicious activity is detected by the lottery-type gaming system, the anonymous account may be automatically or manually locked or frozen by the lottery-type gaming system until such time as the anonymous account holder contacts the gaming administrator for reconciliation and/or resolution.

Other advantages of the anonymous account are in marketing or wager tracking. For instance, customer relationship management (CRM) software of a computer system implementing the anonymous account, unlike the use of cash or vouchers, may be configured to track wagering activities associated with the anonymous account while maintaining the player's anonymity. In this manner, the CRM may follow and track bet patterns, betting trends and betting tendencies, which can be used to develop marketing information or programs. Other advantages of the anonymous account include paperless aspects of the credit instrument, such as the generation of less trash, requiring less labor to set up accounts at a venue having gaming terminals configured for lottery-type gaming and cost savings. Further, lottery-type wagering terminals may be easier and less expensive to maintain and may last longer if printing functions are reduced in frequency or eliminated altogether. Further, the gaming administrator may decide not to replace lost, stolen, destroyed, or altered credit instruments, along with any funds from a credit instrument that is used without the owner's permission.

The amount of money associated with the credit instrument issued to the player may be in a predenominated amount such as, for example, $20, $30, $40, or $50, etc. Gaming administrators may also market the credit instrument in the form of a gift certificate or a gift card to attract customers. In one embodiment, the credit instrument may act as a cash substitute, wherein a person must have the physical credit instrument in order to redeem any cash balance. Further, the credit instrument may be reusable and used from one day to a subsequent day. If the patron is a member of a "rewards" program offered by the gaming administrator, the credit instrument may be associated with the rewards program such that each wager placed using the credit instrument will accrue points or another value with the rewards program. The rewards points may be used for a variety of different purposes such as, for example, credit for wagering and non-wagering purposes, redemption of gifts and prizes (consumer goods, airline tickets, hotel rooms), etc. In another embodiment, the "rewards" program may be associated with an anonymous account such that a player may remain anonymous and, yet, accrue awards points.

In another embodiment, the anonymous account associated with the credit instrument or the unique identifier may be upgraded by the patron, wherein the credit instrument is converted to an "account card" by the patron giving the gaming administrator his or her name, address and any other required information at a staffed or self-serve terminal, or the credit instrument may be issued initially to the patron as an account card. If the anonymous account associated with the credit instrument or the unique identifier is upgraded, the patron may continue to use the same credit instrument as an account card or the gaming administrator may issue another replacement card. In this embodiment, the account house card may be automatically configured to record rewards points for each lottery-type wager placed using funds associated with the account card. Additionally, funds may be transferred between the account associated with the patron's account card and his or her bank account by direct deposit. The account house card may give the owner an additional level of security because their identity is known. Thus, the account associated with the account house card may be promptly frozen and/or replaced by the gaming administrator if the house card is lost, stolen or accidentally destroyed.

In an additional embodiment, the credit instrument may also be a so-called "super card" which comprises a combination stored value card and debit/credit card. In other words, the super card may be used as both a debit/credit card and a house card with an associated account set up with a gaming administrator. In one particular aspect of the super card useful for marketing by the gaming administrator, when the debit/credit card function of the super card is used for a purchase, reward points formulaically calculated based upon the purchase price may be credited toward the account set up with the gaming administrator. For example, if a patron uses the super card as a debit or credit card to purchase groceries, a predetermined percentage of the price of the groceries may be credited toward the account associated with the gaming administrator (i.e., the house card portion) of the super card. The house card portion of the super card may be set up so that it may only be able to be used with the gaming administrator for specific uses, such as lottery-type wagering. Funds from the different portions of the super card (i.e., the debit or credit card portion and the house card portion) may be transferred to and from each other. In a further embodiment, an account associated with the credit instrument may also accrue points for wagering, wherein the points may be converted to a cash balance and transferred to other portions or accounts associated with the credit instrument.

When the player is finished gaming or at any other point in time permitted under rules set by the gaming administrator, any balance associated with the credit instrument or the unique identifier may be transferred to the player's bank account, cashed-out, or the balance may remain in the account associated with the credit instrument or the unique identifier. The player may cash-out a balance on the credit instrument at any staffed or self-serve terminal at a venue offering lottery-type gaming. The player may also have a cash voucher issued by a self-serve terminal at the venue that can be redeemed at a later time either by mail or at a staffed terminal. If a balance is kept in the account associated with the credit instrument or the unique identifier, administrative fees may be deducted by the gaming administrator from the remaining balance after a predetermined time period of non-use (e.g., 12 months).

Intra-Operability of the Credit Instrument with a Financial Network

Players and gaming administrators both desire the use of a single credit instrument for making lottery-type wagering and non-wagering purchases (i.e., to purchase goods or services). Thus, in yet an additional exemplary embodiment, a credit instrument is associated with multiple accounts with discrete balances. In one embodiment, the credit instrument is associated with an account or a balance of a player at a financial institution through a financial network (e.g., a bank or a credit card company) and an account or balance of the player associated with a closed-loop system such as, for example, a lottery-type gaming system. The financial network balance may be, for example, a credit limit of a credit card or an amount of money in an account associated with a debit card. The balance associated with the closed-loop system may be, for example, an amount of money credited to or transferred from another account such as, for example, the account associated with the financial network balance, and in another embodiment, the balance associated with the closed-loop system may be an anonymous account as described herein. In one embodiment, the closed-loop system is a computer system 602 indicated with dashed lines in FIG. 7. In yet other embodiments, the credit instrument may be associated with other or additional accounts or balances.

Figure 7:
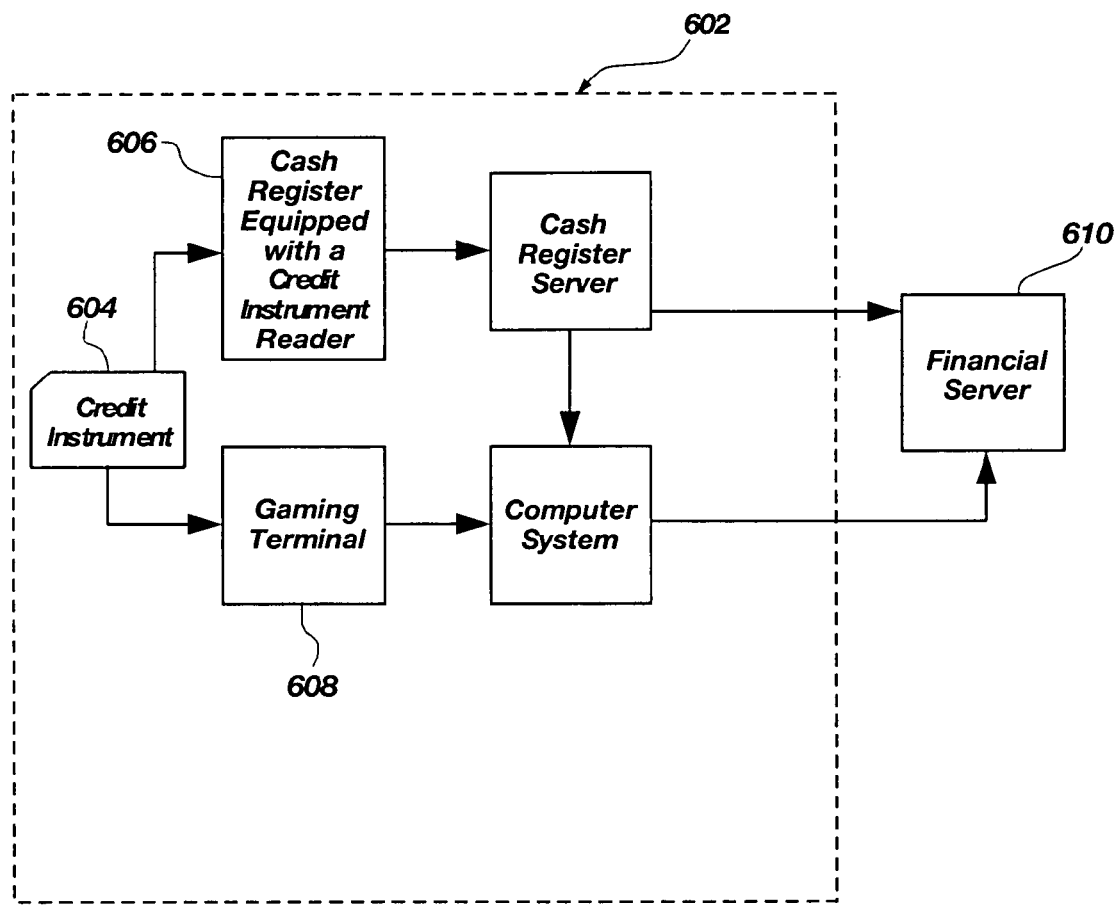
FIG. 7 is another example of the ability to use a credit instrument onsite from a venue offering lottery-type gaming.

With credit instrument 604 of FIG. 7, a player is enabled to utilize an input device of the computer system 602 such as, for example, a cash register 606 or a gaming terminal 608 associated with the computer system 602 in order to transfer funds between a first account accessible by the player and associated with the financial network balance and a second account accessible by the player and associated with the balance of the computer system 602. For example, at the beginning of a day, a player at a venue offering lottery-type gaming may have a $100 balance on the first account associated with the financial network and a $0 balance of the second account associated with the computer system 602. The player may use the input device associated with the computer system 602 to transfer funds from the first account balance associated with the financial network to the second account balance associated with the closed-loop system. In this manner, the player is enabled to transfer $50 from the first account associated with the financial network balance to the second account associated with the closed-loop system such that the player may access the transferred-in $50, augmenting the balance of the second "account" associated with the closed-loop system to purchase or place one or more lottery-type wagers at the gaming venue without incurring multiple fund-transfer charges. The other, remaining $50 balance of the first account associated with the financial network may be used to purchase other goods or services at the venue such as, for example, food from concessions with a point-of-sale terminal networked to the financial server 610. In other embodiments, the player may access and transfer funds between the multiple accounts associated with the credit instrument remotely such as, for example, with a telephone-based system or via the Internet.

By using the credit instrument 604 associated with multiple accounts and their associated balances, the player is enabled to place lottery-type wagers and purchase other goods or services, such as concessions, with a single credit instrument. The credit instrument 604 is also reusable in that the credit instrument 604 may be used more than once during any day and on more than one day. Further, the player is enabled to avoid any financial network charges that may be incurred on a per transaction basis (i.e., each time a person accesses his/her balance on a financial network, the financial institution may charge a service fee) and dollar-based costs by conducting a "bulk" transfer of funds from the financial network to the closed-loop computer system 602 and vice versa. Further, the use of multiple balances associated with the credit instrument 604 enables the player to place last-minute or last-second lottery-type wagers without having to connect to the financial server 610, since the funds to be employed already reside in the player's account in the closed-loop computer system 602. Thus, the lottery-type wager, and particularly a last-minute wager, is more likely to be incentivized and made since the potential for a failure in making and holding a connection between the closed-loop computer system 602 and the financial server 610 while a wager is being attempted is eliminated, thus increasing player satisfaction.

In yet another embodiment, the credit instrument may be associated with a marketing program to provide incentives for a player having the credit instrument to use the credit instrument and earn credit for placing lottery-type wagers. For instance, if the credit instrument is a credit card or a debit card, the account associated with the credit instrument may be set up such that deposits are made to the second account associated with the closed-loop system upon use of the credit instrument to make purchases with the first account associated with the financial network. In this manner, each time the player uses the credit instrument to make a purchase, a specified amount of funds or formulaically calculated reward points (such as, for example, a percentage of the value of the purchase) is automatically deposited or credited into the second "account" associated with the balance of the closed-loop system. For example, a player's DISCOVER® credit card may be set up such that upon making a purchase with the DISCOVER® credit card, a deposit or credit is made to the balance of the second account associated with the closed-loop system based on the level or amount of purchases for which the DISCOVER® credit card is used. In this manner, as the player uses the credit instrument to purchase concessions, goods or services at the venue offering lottery-type gaming or other venue, the player may earn credit or funds for lottery-type wagering. Further, in order to provide additional incentives for the player to use the credit instrument associated with the multiple accounts, the player may receive extra or bonus credit for using the credit instrument to make specific purchases such as, for example, by spending money from the first account on other goods or services associated with, or sponsored by, the gaming administrator. In another embodiment, the second account and associated balance of the closed-loop system may be an account specific to a particular venue offering lottery-type gaming or associated with a particular company or other sponsor.

In another embodiment, a credit instrument may be used onsite at a venue offering lottery-type gaming. The credit instrument may be used at a gaming terminal or, by way of example, a cash register configured to read the credit instrument. The player's account information and balance may be accessed from the computer system if the information is contained thereon or from an offsite financial server or similar device. The credit instrument may also be used offsite at a cash register configured to read the credit instrument, an offsite ATM, or a gaming terminal at another location. The account associated with the credit instrument may also be used to place wagers and buy goods and/or services over the Internet or phone.

Lottery-Type Gaming System

Referring to FIG. 1A, a lottery-type gaming system 100 is illustrated in the form of a block diagram, in which the lottery-type gaming methods of the present invention described herein may be implemented. The lottery-type gaming system 100 may include a lottery-type gaming terminal 102 that includes a player or teller interface 109, microprocessor 106 including associated memory and software, network interface apparatus 104 with associated software, and a printer 123 if desired. The lottery-type gaming terminal 102 may have a housing (not shown) that supports the player or teller interface 109 including a device for reading the credit instrument 114 (optionally used in conjunction with secondary identifier input device 113), an input device 110, and a display 112. In one embodiment, the device for reading the credit instrument is a card reader when the credit instrument is a card. In other embodiments, the device for reading the credit instrument is any device capable of recognizing a unique identifier associated with the credit instrument or if an anonymous account is set up without a credit instrument, the device comprises an input device such that the player or teller may enter a unique identifier such as a user name or a biometrics scanner recognizable feature (e.g., a fingerprint). A secondary identifier input device 113 may be integrated, if desired, with the device for reading the credit instrument 114. The microprocessor 106 and its associated memory and software are in electrical communication and operably coupled with the network interface apparatus 104. The network interface apparatus 104 is operably coupled to a gaming administrator computer system 116, which may include a database of player accounts, via a phone line, cable line, or other suitable, secure connection.

The gaming administrator computer system 116 may be located at the headquarters of the gaming administrator or other secure site. Such a computer system may be configured to store the player's account information and balance.

The player or teller interface 109 is in electrical communication and operably coupled to the microprocessor 106 and provides the mechanisms necessary for a player to initiate funds transfer to and from the player's account on the gaming administrator computer system 116. The device for reading the credit instrument 114 of the player or teller interface 109 is configured for reading encoded information on a credit instrument. The credit instrument may, optionally, be used with a unique secondary identifier input device 113 such as, for example, a smart card with embedded microchips, an array of buttons for entry of a personal identification number (PIN) or other code, a key, a fingerprint imaging device, a retinal scan, or other biometrics device for added security measures to help verify a player's identity and account. By utilizing the device for reading the credit instrument 114, the gaming administrator may dispense with the use of paper ticket readers. Compared to conventional paper ticket readers currently used by most gaming administrators, a device for reading the credit instrument 114 is less expensive and more reliable. Conventional paper ticket readers often have problems reading damaged paper tickets, creating patron frustration and incorrect ticket rejections. Furthermore, the credit instrument, which may be made from a material such as plastic, is much more durable than conventional paper tickets which are easily damaged by moisture and handling.

The display 112 may comprise a display such as a liquid crystal display (LCD), an LCD touch screen, a plasma display, a field emission display (FED), or employ any other suitable display technology known to those of ordinary skill in the art. The display 112, under control of the microprocessor 106, displays information pertinent to the transfer of funds from the player's account with the gaming administrator. Such information may include, for example, a prompt to enter a personal identification number, a notice that the transfer of funds was authorized, an amount of the authorized transfer, and the player's account balance.

The input device 110 may comprise, for example, a keypad, control buttons, touch display, a joystick, a touch screen, or a combination thereof. The input device 110 allows the player or teller to place the lottery-type wager by enabling the player or teller to select the outcome of the event being wagered on.

Figure 1B:
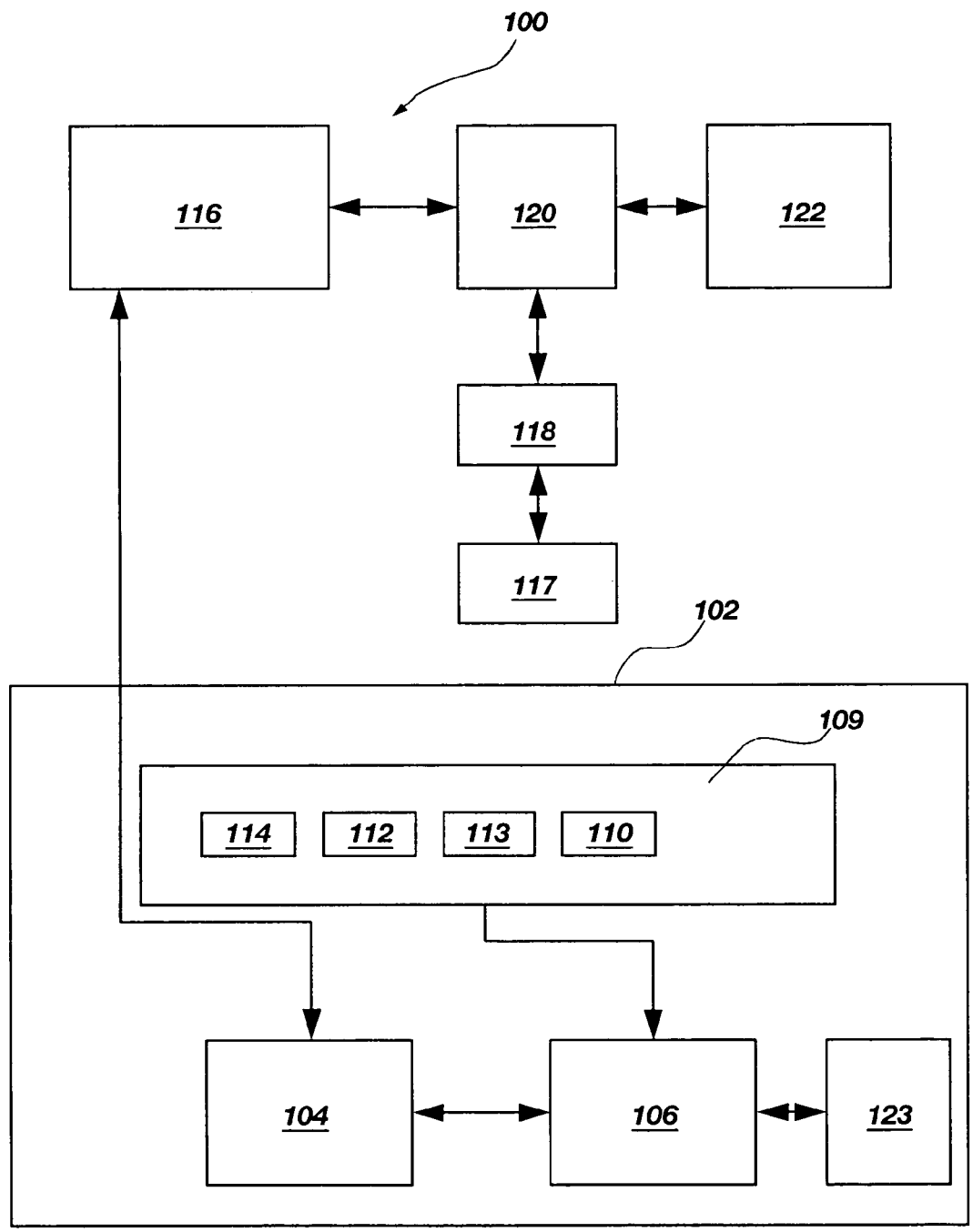
Figure 1C:
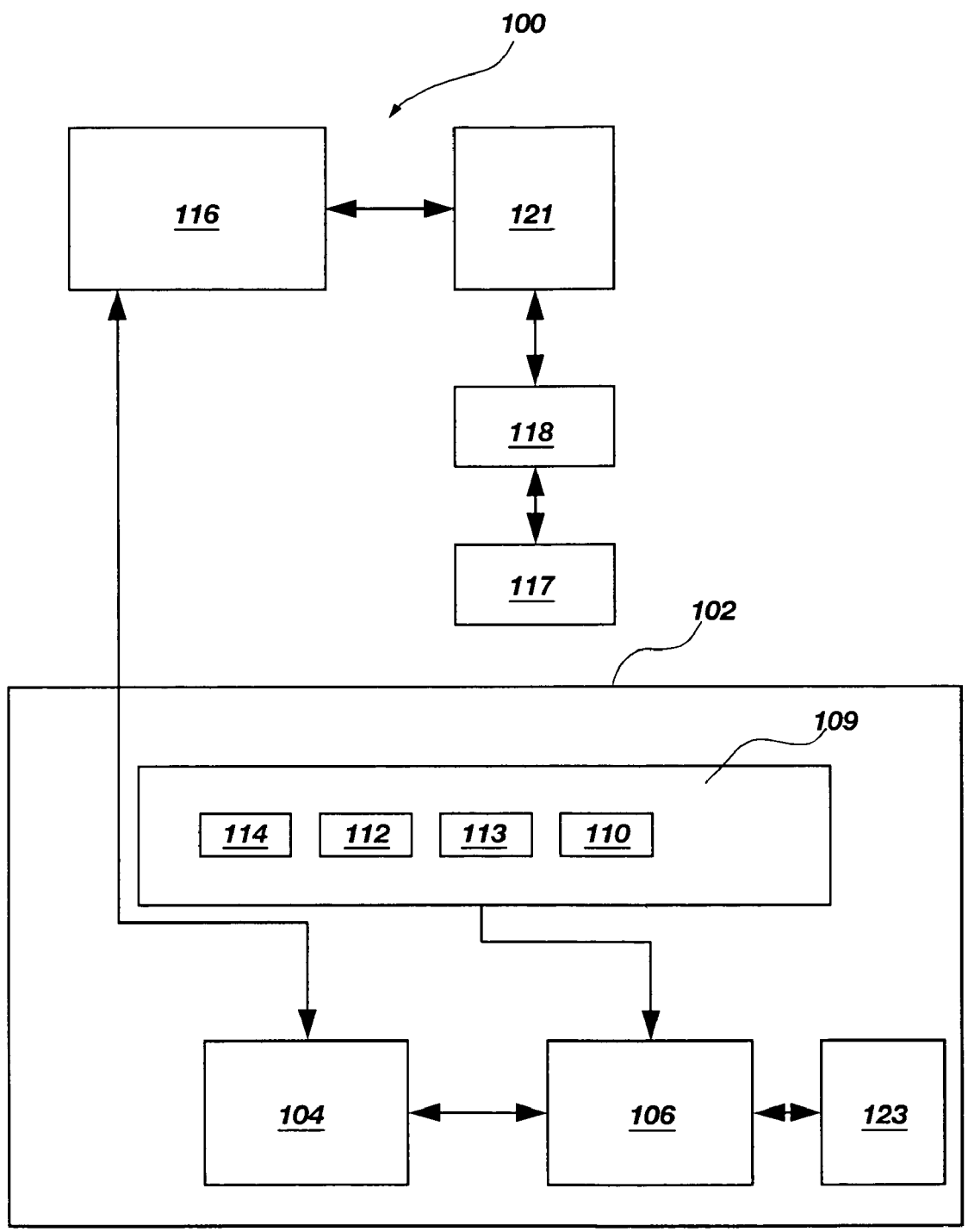

The lottery-type gaming terminal 102 may be configured with network interface apparatus 104 including components such as ports, cable connections, and/or network cards for linking the lottery-type gaming terminal 102 to the lottery-type gaming administrator computer system 116 via an intranet and/or other network (e.g., a local area network (LAN), a wide area network (WAN), the Internet (also referred to as the World Wide Web), etc.). Encrypted communications may be employed for additional security if necessary or desirable. Although only a single lottery-type gaming terminal 102 is shown in FIG. 1A, a plurality of lottery-type gaming terminals 102 may be connected to the gaming administrator computer system 116 (e.g., a central server) using such a network. As shown in FIG. 1B, a lottery-type gaming administrator computer system 116 may also be operably coupled to an electronic funds transfer (EFT) system 120 through a connection such as, for example, by a phone or cable line, in order to utilize payment with a credit instrument such as a credit/debit card. The EFT system 120 is, in turn, operably coupled to credit/debit card-issuing system 122 using a cable or phone line. As shown in FIG. 1C, in another system for implementing the methods of the present invention utilizing a credit instrument, the gaming administrator computer system 116 will not have the player's account information and balance stored on it. Instead, the gaming administrator computer system 116 may be operably coupled to a financial server 121 at a separate location from the gaming administrator computer system 116 that has the player's account balance and associated account information stored on it. It is also understood that the present invention embraces employing a commercially available customer relationship management (CRM) system, such as PEOPLESOFT®, to manage and store the player's account information and account balance. The CRM system may be used in conjunction with gaming administrator computer system 116 or in conjunction with an offsite computer server in communication with the gaming administrator computer system 116 and computer server 118.

A device for reading the credit instrument 117, optionally having a secondary identifier input device 113 associated therewith (not shown), may be located at concessionaires, admission entrances or special access areas of establishments offering lottery-type gaming ticket purchases, and may be in communication with either the gaming administrator computer system 116, the EFT system 120, or the financial server 121 via the computer server 118 as respectively illustrated in FIGS. 1A-1C.

Figure 2A:
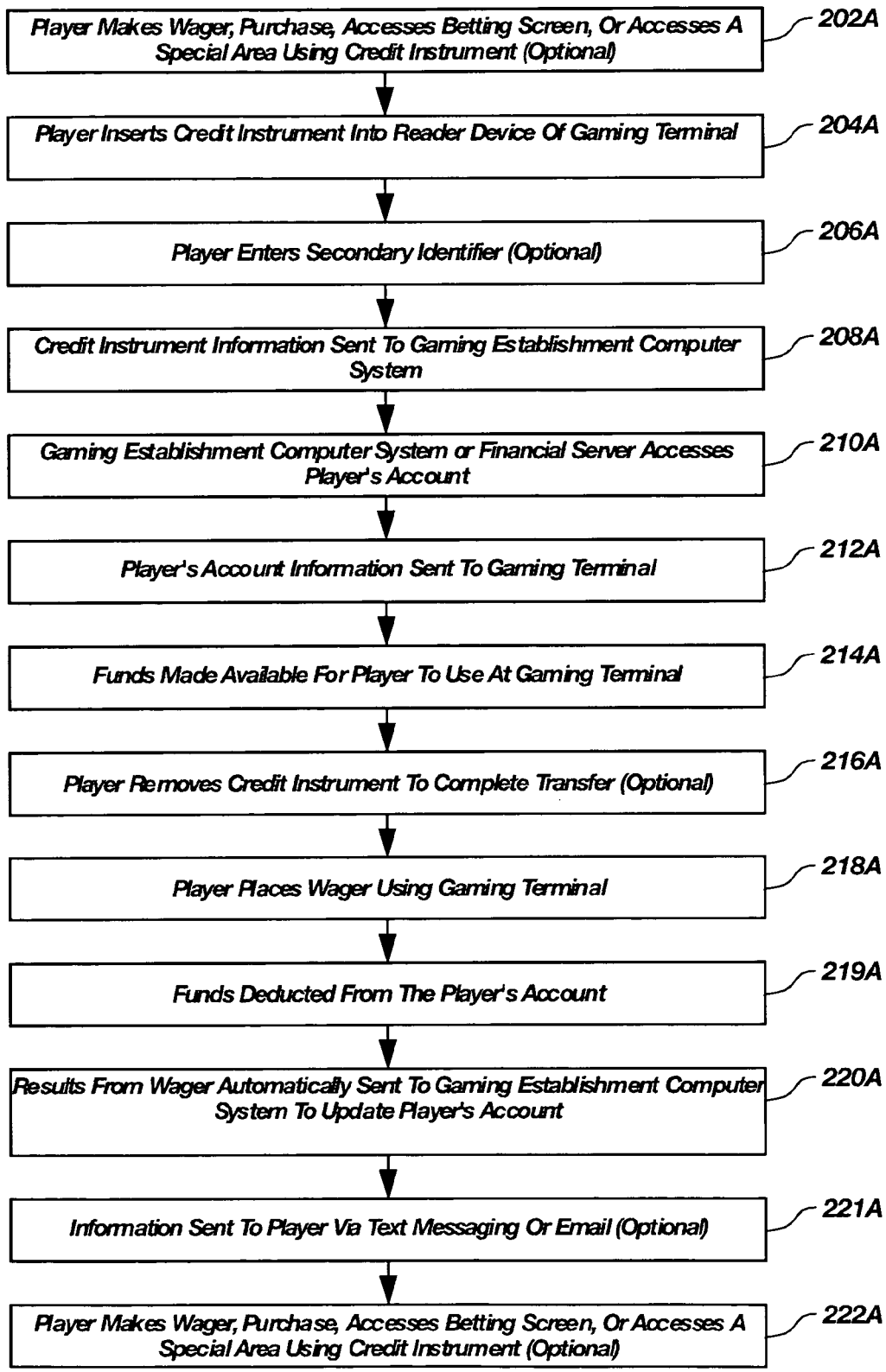
FIG. 2A is a process flow diagram of an exemplary method of the present invention which utilizes a credit instrument for lottery-type wagering and for purchase of goods and/or services.

FIG. 2A comprises a process flow diagram illustrating one method of practicing the present invention, which method uses a credit instrument as a cash substitute for lottery-type wagering and purchases of goods and/or services at a gaming establishment such as, for example, a lottery retail establishment, horse or dog track, jai alai fronton, or casino, or another venue such as a resort, a sports stadium, an airport or a shopping center. In one embodiment, the method comprises using the credit instrument to enable the player to participate in the lottery-type gaming activity. The method will be described in conjunction with FIGS. 1A and 1C. Prior to act 202A, a player may have already used his or her credit instrument for placing a lottery-type wager, for the purchase of products and/or services, for accessing additional betting screens, and/or for gaining entry into a secure area such as a clubhouse at a gaming establishment, an airline club or a skybox suite at a stadium. The purchase of a product or the placement of a lottery-type wager may be effectuated with different identifiers associated with the credit instrument. For instance, the credit instrument may be associated with more than one identifier such as, for example, a card number, a magnetic stripe, or a bar code. Examples of products or services available for purchase at the gaming establishment or other venue may include, without limitation, food, drink, parking, admission, among many others. Next, in act 204A a lottery-type gaming terminal 102, located at a staffed or self-serve terminal, detects that a player has inserted a credit instrument into device for reading the credit instrument 114 of a lottery-type gaming terminal 102. If the lottery-type gaming terminal 102 does not have a device for reading the credit instrument 114, the player's account information may be manually entered into the player or teller interface 109 using a keypad or other suitable interface device. Optionally, for security purposes, act 206A may be required where the player enters into the player or teller interface 109 through a secondary identifier input device 113 a secondary identifier such as a personal identification number (PIN) entered on a keypad, or uses a smart card with an embedded microchip, an electronic button for entry of a code such as a PIN at the player or teller interface 109, a finger print imaging device, a retinal scan, or another type of biometrics device for added security measures to help verify a player's identity for the account to be accessed. The player may also be allowed to change their PIN using the player or teller interface 109. If the player changes his or her PIN, the lottery-type gaming terminal 102 may be programmed to require the player to enter the new PIN each time the credit instrument is used. The software of the lottery-type gaming terminal 102 or the device for reading the credit instrument 114 may be programmed to lock-out an account (i.e., prevent access to the account) if the player enters the incorrect PIN a predetermined number of times.

Again referring to FIG. 2A, after act 204A or 206A, the player's account information associated with the credit instrument, such as a unique identification number, is sent to the gaming administrator computer system 116 in act 208A. In act 210A, the gaming administrator computer system 116 or the financial server 121 accesses the player's account information associated with the credit instrument. Act 210A may take place without the player inputting the desired amount of playing credit. Instead, the lottery-type gaming terminal 102 interface software may automatically generate a request for the amount of credit on the player's account. If the system of FIG. 1C is utilized, the player's account information and balance is not stored on the gaming administrator computer system 116 and the gaming administrator computer system 116 forwards a request to the financial server 121 to access the player's account information and balance. In act 212A, the player's account information associated with the credit instrument is automatically sent to the lottery-type gaming terminal 102 from the gaming administrator computer system 116 directly if the system of FIG. 1A is utilized or indirectly via the financial server 121 if the system of FIG. 1C is utilized. If the player's account balance contains a positive balance, funds are made available for the player to use at the lottery-type gaming terminal 102 in act 214A.

Optionally, in order to prevent the player from leaving their credit instrument in lottery-type gaming terminal 102, the lottery-type gaming terminal 102 software may be programmed so that the player is required to remove his or her credit instrument at act 216A before placing the lottery-type wager. In act 218A, the player places a lottery-type wager on an event (e.g., drawing or drawings) using the player interface 109 of the lottery-type gaming terminal 102, which may be optionally linked to a player input device 110. Following the placement of the lottery-type wager, in act 219A the funds may be automatically deducted from the player's account. Optionally, if the lottery-type gaming terminal 102 is equipped with a printer 123, the player may receive a printed receipt recording the lottery-type wager placed.

After the conclusion (e.g., conduct of the drawing or drawings) of the lottery-type wagering event, the results are automatically sent to the gaming administrator computer system 116 and, if necessary, forwarded to the financial server 121 via gaming administrator computer system 116, which updates the player's account information in act 220A. In other words, after the lottery-type event that the player wagered upon is over, the player's account balance is updated such that winnings are added to the account balance. Following the results of the lottery-type wager, in act 221A, which may occur after or simultaneously with act 220A, the results of the lottery-type wager, the player's account balance, or both may be sent to the player via text messaging to the player's pager, cellular phone, or emailed to the player's email address. Also, after placing his or her lottery-type wager, in act 222A, the player may optionally continue to place wagers on different additional events, make purchases of products and/or services, or use the credit instrument for additional purposes (e.g., clubhouse access, etc.) at the venue using their credit instrument at a device for reading the credit instrument 117.

Any balance remaining in the account associated with the credit instrument may also be cashed out at a staffed terminal, a voucher may be issued at a self-serve terminal at the venue that is equipped with a device for reading the credit instrument 117, or the credit instrument may be mailed or presented in person to the gaming administrator for redemption. The remaining balance may, also, be transferred by direct deposit to the player's bank account. Any remaining balance may also be left in the account associated with the credit instrument such that the player may reuse the credit instrument at a subsequent time. The purchase of goods and/or services and the use of the credit instrument for additional purposes at the venue may be effected by the concessionaires of the goods and services using device for reading the credit instruments 117 that enable purchases with the credit instrument. Again, after each subsequent lottery-type wager or purchases of goods and/or services, the player's account information may be automatically updated on the computer system 116. If the funds of the account associated with the credit instrument are depleted or if the player desires additional funds, the player may add funds to the account using cash, check, or credit/debit card at any staffed or self-serve terminal that accepts such payments. Staffed or self-serve terminals may be located at the venue that have a device for reading the credit instrument 117 that enables adding funds to the account associated with the credit instrument with a player's credit/debit card, checks, cash, etc.

Figure 2B:
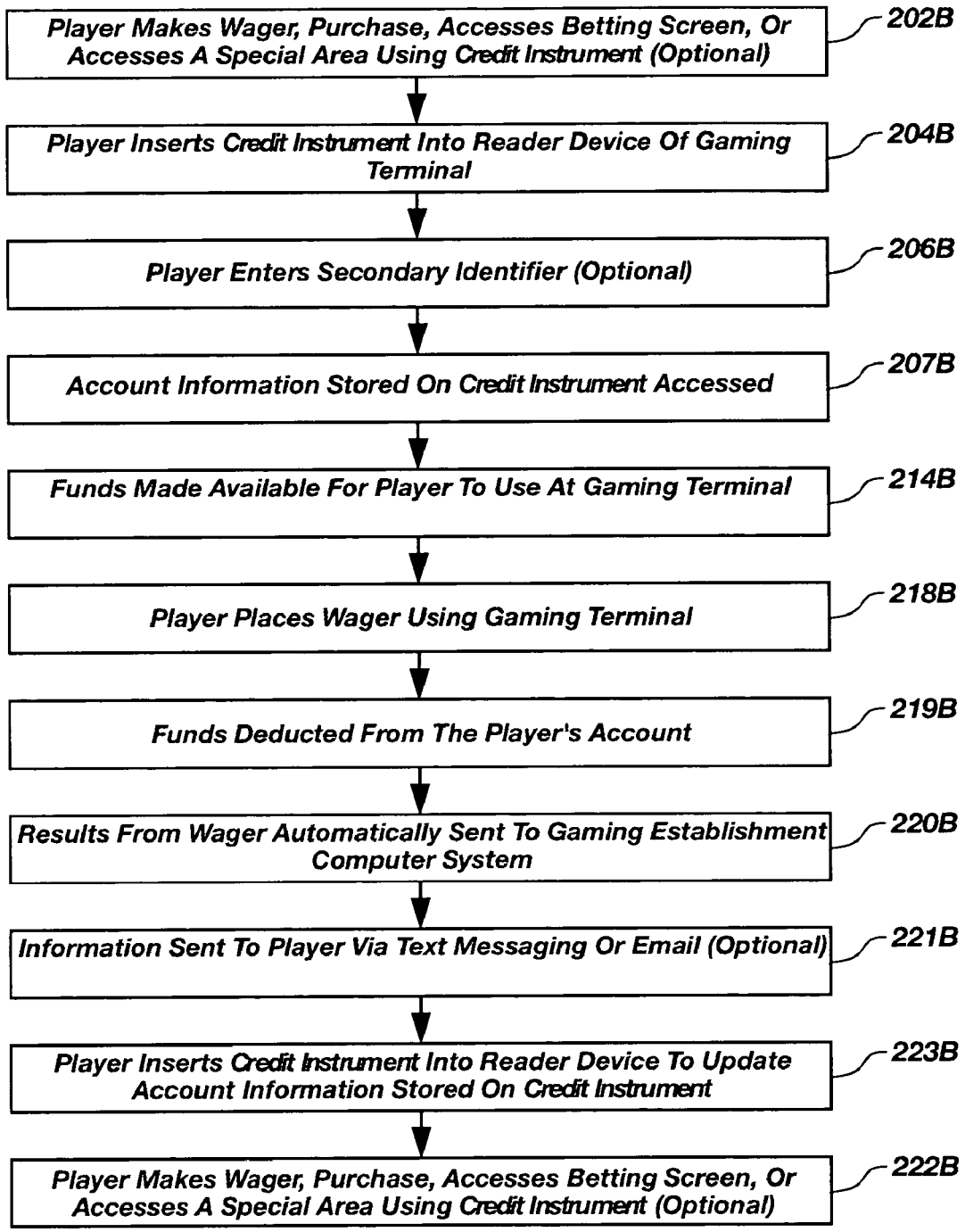
FIG. 2B is a process flow diagram of an exemplary method of the present invention which utilizes a credit instrument comprising a smart card for lottery-type wagering and for purchase of goods and/or services.

Referring to FIG. 2B, a process flow diagram for another method of the present invention is illustrated, which method utilizes a house card comprising a credit instrument as a cash substitute for lottery-type wagering and purchases of goods and/or services at a gaming establishment or other venue. The credit instrument is associated with a memory chip or similar device that stores the player's account information and balance. The method will be described in conjunction with FIG. 1A. Prior to act 202B, a player may have already used his or her credit instrument for placing a lottery-type wager, for the purchase of products and/or services, for accessing additional betting screens, and/or for gaining entry into a secure area at the gaming establishment or other venue. Examples of products or services available for purchase at the gaming establishment or other venue may include food, drink, parking, admission, among many others. Next, in act 204B a lottery-type gaming terminal 102, located at a staffed or self-serve terminal at the venue, detects that a player has inserted a credit instrument into the device for reading the credit instrument 114 of a lottery-type gaming terminal 102. Optionally, for security purposes, act 206B may be required where the player enters into the player or teller interface 109 through a secondary identifier input device 113 a secondary identifier such as a personal identification number (PIN) or uses the credit instrument associated with a smart card with an embedded microchip, an electronic button for entry of a code such as a PIN at the player or teller interface 109, a finger print imaging device, a retinal scan, or another type of biometrics device for added security measures to help verify a player's identity for the account to be accessed. The player may also be allowed to change his/her PIN using the player or teller interface 109. If the player changes his/her PIN, the lottery-type gaming terminal 102 may be programmed to require the player to enter the new PIN each time the credit instrument is used. The software of the gaming terminal 102 or the device for reading the credit instrument 114 may be programmed to lock-out an account (i.e., prevent access to the account) if the player enters the incorrect PIN a predetermined number of times.

Again referring to FIG. 2B, after act 204B or 206B, the player's account information associated with the credit instrument is accessed by the lottery-type gaming terminal 102 in act 207B. If the player's account balance contains a positive balance, funds are made available for the player to use at the lottery-type gaming terminal 102 in act 214B. In act 218B, the player places a lottery-type wager on an event using the lottery-type gaming terminal 102, which may be optionally linked to an input device 110. Following the placement of the lottery-type wager, in act 219B the funds may be automatically deducted from the player's account updating the account balance stored on the credit instrument. Optionally, if the lottery-type gaming terminal 102 is equipped with a printer 123, the player may receive a printed receipt recording the lottery-type wager placed.

After the conclusion of the lottery-type wagering event, the results are automatically sent to the computer system 116 at act 220B. Following the results of the lottery-type wager, in act 221B, which may occur after or simultaneously with act 220B, the results of the lottery-type wager may be sent to the player via text messaging to the player's pager, cellular phone, or emailed to the player's email address. In act 223B, the player may update his or her account information associated with their credit instrument, anytime after the results of the event are official, by inserting the credit instrument into a device for reading the credit instrument 117 which communicates with the gaming administrator computer system 116. The gaming administrator computer system 116 communicates the results of the lottery-type event to the credit instrument to update the player's account information associated with the credit instrument. In other words, after the lottery-type event that the player wagered upon is over, the player's account balance is updated such that winnings are added to the account balance associated with the credit instrument. Also, after placing his or her wager, in act 222B, the player may optionally continue to place wagers on different additional events, make purchases of products and/or services, or use the credit instrument for additional purposes (e.g., clubhouse access, etc.) at the venue using their credit instrument at a device for reading the credit instrument 117. Any balance remaining in the account associated with the credit instrument may also be cashed out at a staffed terminal, a voucher may be issued at a self-serve terminal at the venue that is equipped with a device for reading the credit instrument 117, or the credit instrument may be mailed or presented in person to the gaming administrator for redemption. The remaining balance may, also, be transferred by direct deposit to the player's bank account. The purchase of goods and/or services and the use of the credit instrument for additional purposes at the venue may be effected by the concessionaires of the goods and services using device for reading the credit instruments 117 that enable purchases with a credit instrument. Again, after each subsequent wager or purchases of goods and/or services, the player's account balance may be automatically updated and stored in the account associated with the credit instrument. If the funds of the account associated with the credit instrument are depleted or if the player desires additional funds, the player may add funds to the account using cash, check, or credit/debit card at any staffed or self-serve terminal that accepts such payments. Staffed or self-serve terminals may be located at the venue that have a device for reading the credit instrument 117 that enables adding funds to the account associated with the credit instrument with a player's credit/debit card, checks, cash, etc.

Figure 3:
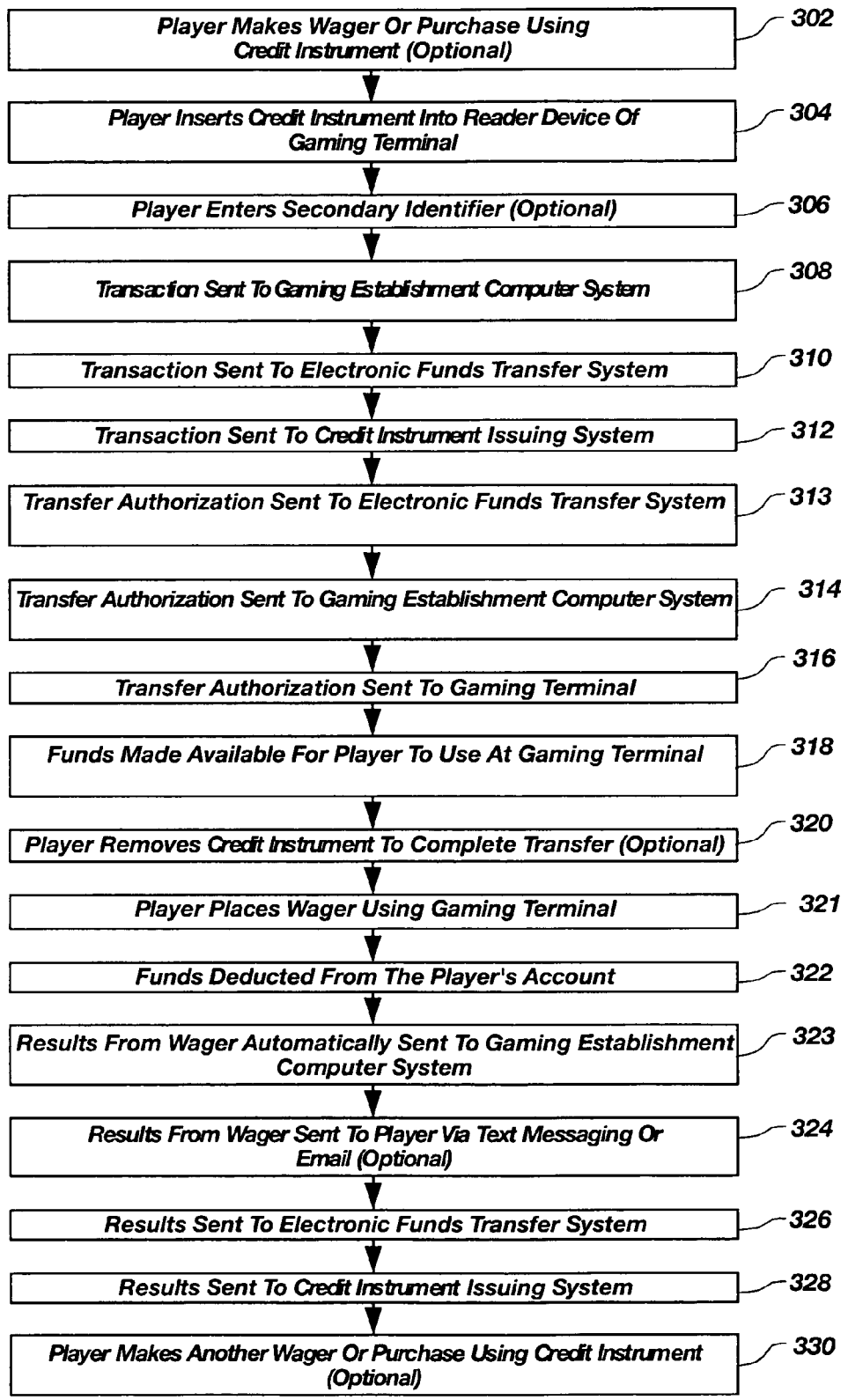
FIG. 3 is a process flow diagram of an exemplary method of the present invention which utilizes a credit instrument for lottery-type wagering and for purchase of goods and/or services.

Referring to FIG. 3, a process flow diagram of an additional method of the lottery-type gaming methods of the present invention that utilizes an EFT system is illustrated. The method will be described in conjunction with FIG. 1B. Prior to act 302, a player may have already used their credit instrument for the purchase of products and/or services at the gaming establishment or other venue or have already placed a lottery-type wager using funds transferred via an EFT system. Next, in act 304, the lottery-type gaming terminal 102, located at a staffed or self-serve terminal at the venue, detects that a player has inserted a credit instrument into device for reading the credit instrument 114 of a lottery-type gaming terminal 102. If the lottery-type gaming terminal 102 does not have a device for reading the credit instrument 114, the player's account information may be manually entered into the player or teller interface 109 using a keypad or other suitable player interface device. As with the method described in FIGS. 2A and 2B, optionally, for security purposes, act 306 may be required where the player enters into a secondary identifier input device 113 of the player or teller interface 109 a secondary identifier such as a personal identification number or uses a credit instrument associated with an embedded microchip, an electronic button for entry of a code such as a PIN at the player or teller interface 109, a finger print imaging device, a retinal scan, or another type of biometrics device for added security to help verify a player's identity and account to be accessed. The software of the lottery-type gaming terminal 102 or the device for reading the credit instrument 114 may be programmed to lock-out an account (i.e., prevent access to the account) if the player enters the incorrect PIN a predetermined number of times.

Again referring to FIG. 3, after act 304 or 306, a transaction request for a specific amount of wagering funds is sent to the gaming administrator computer system 116 after the player inputs the desired amount into the player input device 110 of the player or teller interface 109 in act 308. In act 310, the same transaction information is forwarded by the computer system 116 to the EFT system 120 using a phone line, cable line, or other suitable communication mechanism. In act 312, the same transaction information is sent to the credit/debit card-issuing system 122 by the EFT system 120. At this point in the process, the EFT system 120 treats the transaction request like any other transaction it might receive from a point-of-sale terminal or an ATM terminal.

In act 313, if the transaction is authorized by the credit/debit card-issuing system 122, a transfer authorization is sent to the EFT system 120. In act 314, the transfer authorization for funds is forwarded by the EFT system 120 to the gaming administrator computer system 116. In act 316, the transfer authorization is forwarded to the lottery-type gaming terminal 102 from the gaming administrator computer system 116. Following the player's account information and authorization being sent to the gaming administrator computer system 116, the player's desired amount of funds are made available for the player to use at lottery-type gaming terminal 102 in act 318.

Optionally, in order to prevent the player from leaving their credit instrument in the lottery-type gaming terminal 102, the lottery-type gaming terminal's 102 software may be programmed so that the player must remove his or her credit instrument at act 320 in order to place his or her lottery-type wager. The player then removes his or her credit instrument at act 320 and may begin playing the lottery-type gaming terminal 102. In act 321, the player places a lottery-type wager on an event using the lottery-type gaming terminal 102. Following the player placing the lottery-type wager, in act 322 the funds may be automatically deducted from the player's account.

After the conclusion of the lottery-type event that was wagered upon by the player using his or her credit instrument, in act 323, the results from the lottery-type wager may be automatically sent to gaming administrator computer system 116. Following the results of the lottery-type wager, in act 324, which may occur after or simultaneously with act 323, the results of the lottery-type wager may be sent to the player via text messaging to a player's pager, cellular phone, or emailed to the player's email address. In act 326, if the player wins as a result of his or her lottery-type wager, the gaming administrator computer system 116 forwards a request to EFT system 120 to credit the player's account associated with the credit instrument. Then, in act 328, the EFT system 120 sends the request to credit the player's account associated with the credit instrument to the card-issuing system 122, which updates the player's account information.

As with the previous embodiment described with respect to FIGS. 2A and 2B, after placing a lottery-type wager, the player may optionally continue to place lottery-type wagers on different events or make purchases of products and/or services at a venue using the credit instrument at a device for reading the credit instrument 117, if so desired, at act 330. The purchase of goods and/or services at the venue in question may be effected by the concessionaires of the goods and services using devices for reading the credit instruments that enable purchases with a credit instrument. The player may also withdraw cash from an ATM on-site at the venue using the credit instrument. Again, after each subsequent lottery-type wager placed by the player, the player's account information is automatically updated on the gaming administrator computer system 116 and credit transferred to the player's account associated with the credit instrument via the EFT system 120.

Figure 4A:
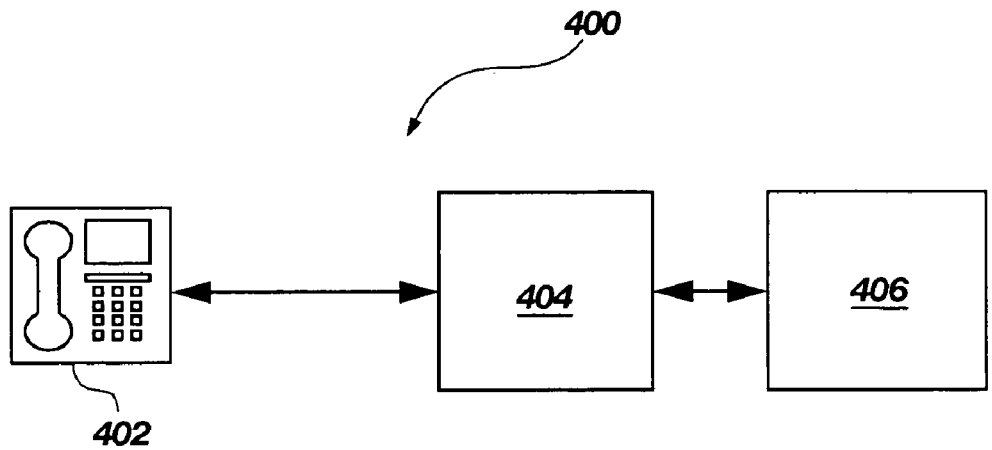
FIGS. 4A and 4B are block diagrams of lottery-type gaming systems in which the lottery-type gaming methods of the present invention described in FIG. 5 may be implemented.
Figure 4B:
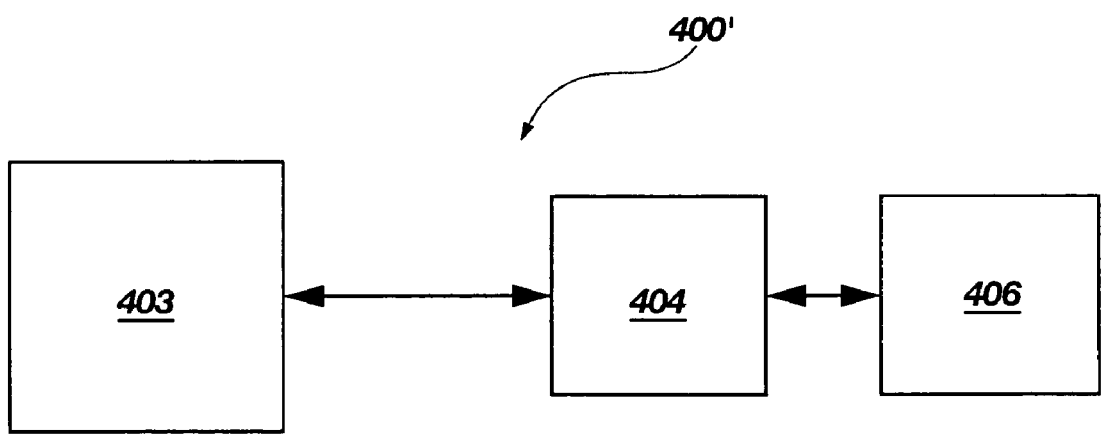

Referring to FIGS. 4A and 4B, lottery-type gaming systems 400 and 400' are illustrated using block diagrams, in which the lottery-type gaming methods of the present invention may be implemented. As shown in FIG. 4A, the lottery-type gaming system 400 utilizes a touchtone telephone 402 for a player to place a lottery-type wager from a location off-site to a venue offering a gaming terminal such as, for example, a player's home, work or hotel room, etc. Again referring to FIG. 4A, a touchtone telephone 402 may be in communication with a remote computer 404. The remote computer 404 may be located at, for example, a gaming administrator headquarters site. The remote computer 404 may be configured to store the player's account information and balance. If the remote computer 404 does not contain the player's account information and balance, the remote computer 404 may be in communication with a financial network 406 which may comprise a financial server 121 (FIG. 1C) or an EFT system 120 and credit/debit card-issuing system 122 (FIG. 1B) via phone line, cable line, or other suitable connection to enable access to the player's account information and balance as effected in the previous embodiments. The communication may be effected between touchtone telephone 402 and remote computer 404 via a conventional phone line.

As shown in FIG. 4B, if a personal computer 403 is used, the communication with the remote computer 404 may be effected using a phone line, cable line, Internet, or other suitable technology. The personal computer 403 may be a conventional personal computer including the associated software to enable communication with remote computer 404. Such communication between the personal computer 403 and the remote computer 404 may occur over the Internet or with a direct connection. Again, the remote computer 404 may be located at a gaming administrator headquarters site or other secure location. Furthermore, when either a touchtone telephone 402 or a personal computer 403 is used, the communication with the remote computer 404 may be encrypted for additional security if necessary or desired. It is also contemplated that wireless communications may be employed, using suitable encryption technology.

Figure 5:
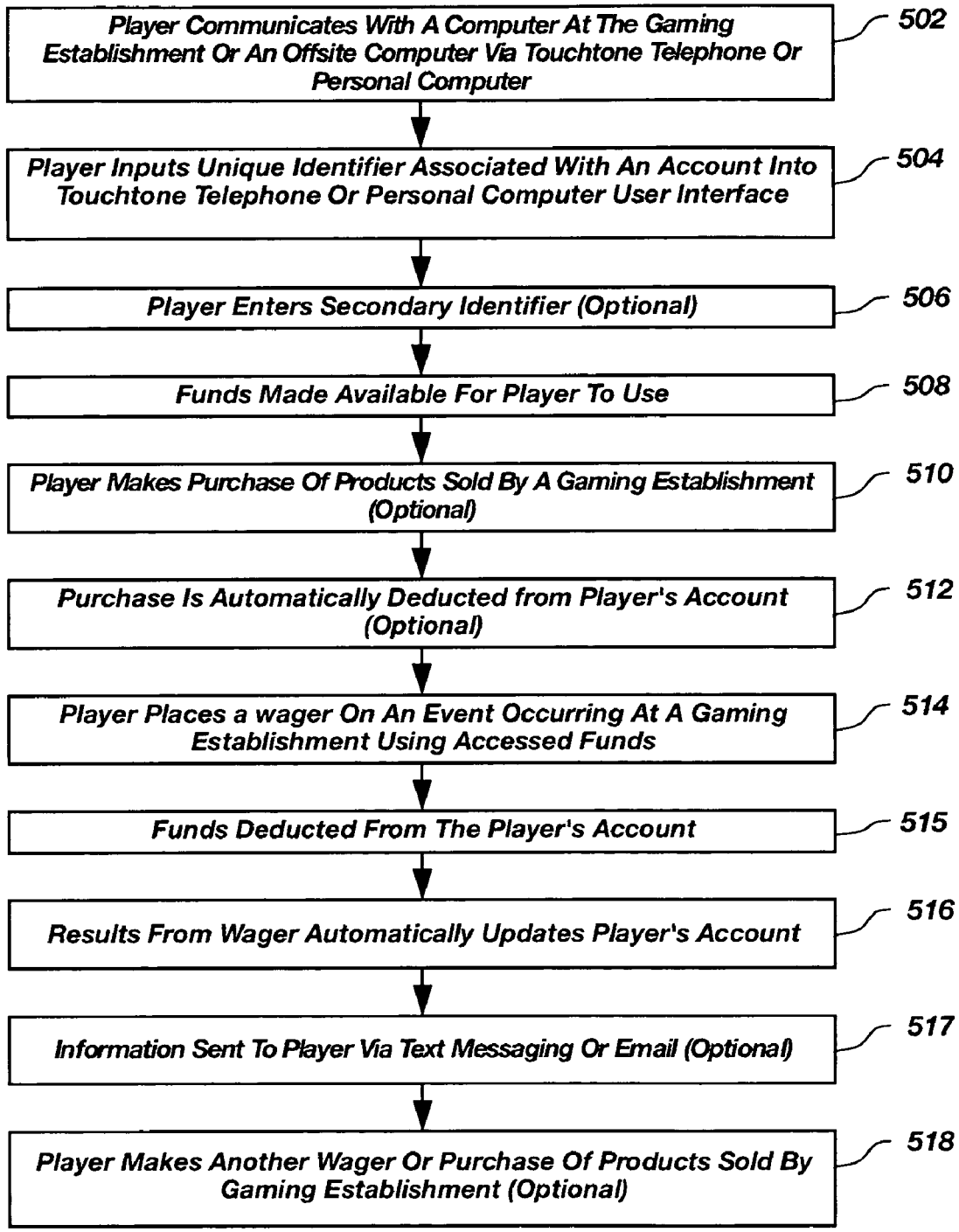
FIG. 5 is a process flow diagram of an exemplary method of the present invention which utilizes a credit instrument for remotely placing a lottery-type wager over a touchtone telephone or a personal computer.
Figure 6:
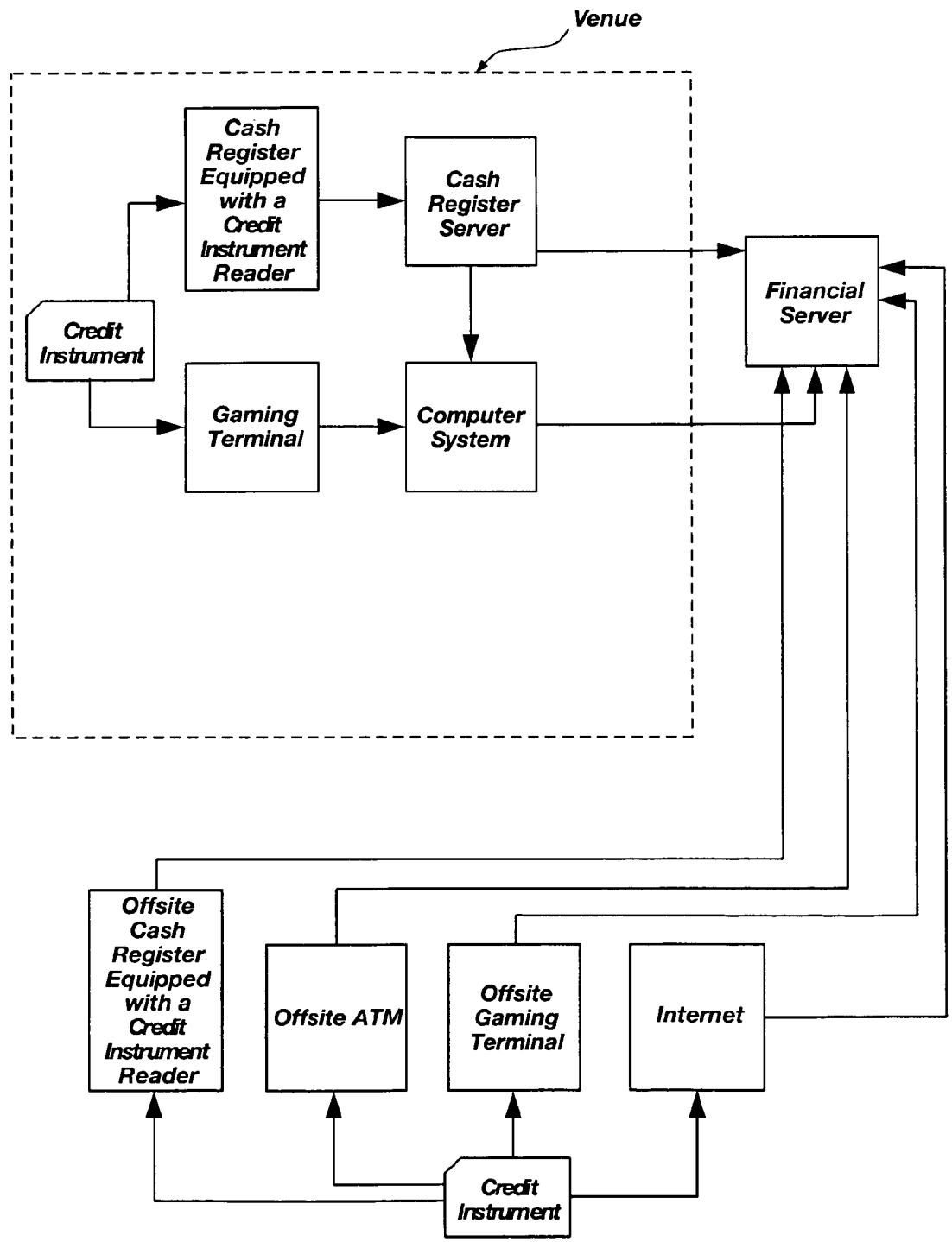
FIG. 6 is an example of the ability to use a credit instrument onsite or offsite from a venue offering lottery-type gaming.

Referring to FIG. 5, a process flow diagram for a method of the present invention is illustrated, which method enables using a monetary account associated with a credit instrument for placing a lottery-type wager remotely over a touchtone telephone or a personal computer. If a house card is used as the credit instrument, the house card may be "upgraded" from the house card that may only be able to be used at venues offering a lottery-type gaming terminal to a house card that is capable of being used for placing lottery-type wagers remotely by the player having the account information reconfigured by the gaming administrator to enable such a use. In act 502, the player communicates with the remote computer 404 which is located at a gaming administrator headquarters site or other secure location. The communication may be initiated by the player dialing a phone number if a touchtone telephone 402 is used or by utilizing an internet connection if a personal computer 403 is used.

In act 504, the player inputs a unique identifier associated with an account, such as a number associated with a credit instrument. The player may input the unique identifier by selecting the appropriate numbers corresponding to the account number on the keypad of the touchtone telephone 402. If a personal computer 403 is used, the player may input the account information in a user interface on the personal computer. The user interface may be made available to the player by accessing a specific host website. Optionally, for security purposes, in act 506, the player may enter a secondary identifier (e.g., a PIN or password) using either the keypad of the touchtone telephone 402 or the user interface of the host website. The account may be locked-out (i.e., access to the account prevented) if the player enters the incorrect PIN or password a predetermined number of times. In act 508, finds from the player's account are made available for the player to use.

Following the funds being made available to the player, in act 510, the player may optionally purchase products or services offered by the gaming administrator via the touchtone telephone 402 or Internet. Examples of products that may be purchased are gift subscriptions for wagering, wagering subscriptions, etc. The purchase may automatically be deducted from the player's account in act 512 as performed in the previous embodiments of FIGS. 2A, 2B, and 3. In act 514, the player may also place a lottery-type wager using the accessed funds from the player's account. This may be accomplished by the player inputting the required information via touchtone telephone 402 or inputting the required information over a user interface on the Internet if personal computer 403 is used. If a remote computer 404 is acting as a central server, the player may be required to select, using either the keypad of the touchtone telephone 402 or a user interface over the Internet, with which gaming administrator he or she desires to place a wager. For instance, the player may have the option of wagering with a number of different gaming administrators. The remote computer 404 may automatically deduct the funds wagered from the player's account in act 515. Following the results of the lottery-type wager, in act 516 the remote computer 404 automatically updates the player's account balance. Acts 515 and 516 may also be performed as in the previous embodiments of FIGS. 2A, 2B and 3. In other words, after the lottery-type event that the player wagered upon is over, the player's account balance is updated such that winnings are added to the account balance. Following the results of the lottery-type wager, in act 517, which may occur after or simultaneously with act 516, the results may be sent to the player via text messaging to a player's pager, cellular phone, or emailed to the player's email address. If the player used a credit instrument to make a purchase or place a lottery-type wager, the account balance associated with the credit instrument may also be sent to the player via text messaging to a player's pager, cellular phone, or emailed to the player's email address. Also, after placing his or her lottery type lottery-type wager, the player may optionally continue to place lottery-type wagers or make purchases of products or services offered by the gaming administrator or other sponsor in act 518. If the funds of the account associated with the credit instrument are depleted or if the player desires additional funds, the player may add funds to the account using a credit/debit card. The player may input his or her credit/debit card number to replenish the account associated with the credit instrument or to add additional funds to it using the touchtone telephone 402 or a user interface at the host website.

Although the foregoing description of embodiments contains many specifics, these should not be construed as limiting the scope of the present invention, but merely as providing illustrations of some exemplary embodiments. Similarly, other embodiments of the invention may be devised which do not depart from the spirit or scope of the present invention. Further, features or elements of different embodiments may be employed in combination. The scope of the invention is, therefore, indicated and limited only by the appended claims and their legal equivalents, rather than by the foregoing description. All additions, deletions, and modifications to the present invention, as disclosed herein, which fall within the meaning and scope of the claims, are embraced thereby.

What is claimed is:

1. A method of lottery-type wagering, the method comprising:
    providing a gaming terminal configured for placing a lottery-type wager;
    providing a player an opportunity to place funds in an anonymous account comprising withholding an identity of the player from a gaming administrator;
    providing the player with an opportunity to associate the anonymous account with a credit instrument;
    enabling the player to access at least a portion of the funds of the anonymous account for use in placing the lottery-type wager;
    enabling the player to place the lottery-type wager using the at least a portion of the funds of the anonymous account;
    enabling the player to use the credit instrument to purchase goods or services with another portion of the funds of the anonymous account at a terminal other than a gaming terminal; and
    crediting the anonymous account with a predetermined percentage of a purchase separate from the gaming terminal for goods or services made with the credit instrument.

2. The method according to claim 1, further comprising using the credit instrument to access an informational display at a venue offering lottery-type gaming.

3. The method according to claim 1, further comprising providing the player with an opportunity to add additional funds to the anonymous account.

4. The method according to claim 1 wherein enabling the player to access the at least a portion of the funds comprises sending a request for allocation of the at least a portion of the funds to a remote computer in communication with the gaming terminal.

5. The method according to claim 4, wherein enabling the player to access the at least a portion of the funds further comprises receiving the at least a portion of the funds requested from an authorization sent to the gaming terminal from the remote computer.

6. The method according to claim 1, further comprising updating the anonymous account with winnings from a result of the lottery-type wager.

7. The method according to claim 1, wherein the credit instrument is selected from the group consisting of a house card, a credit card, a smart card, a debit card, a bank card, a token card, an anonymous token card, a lottery-type gaming venue issued card, a voucher, an ATM card, a smart card account, a combination house card/credit/debit card, a token/debit card, a stored value card, a pre-owned instrument, a gift card, a cell phone, a personal digital assistant, and combinations of any thereof.

8. The method according to claim 1, further comprising selecting the credit instrument to have a predenominated amount of funds.

9. The method according to claim 1, further comprising:
    wherein enabling the player to access the at least the portion of the funds comprises placing the credit instrument into the gaming terminal; and
    requiring that the player remove the credit instrument from the gaming terminal prior to placing the lottery-type wager.

10. The method according to claim 1, wherein enabling the player to access the at least a portion of the funds for use at the gaming terminal further comprises requesting a specific amount of funds as determined by the player.

11. The method according to claim 1, further comprising:
    selecting the credit instrument to be associated with a second monetary account associated with a debit card account or a credit card account;
    transferring funds from the second monetary account to the anonymous account; and
    using the at least a portion of the funds from the monetary account to place the lottery-type wager.

12. A method of conducting a lottery-type gaming activity, the method comprising:
    providing a gaming terminal associated with a device for reading a credit instrument;
    providing a player an opportunity to associate an anonymous account having a monetary value and withholding an identity of the player from a gaming administrator with the credit instrument readable by the device;
    enabling the player to place a lottery-type wager using the credit instrument;
    enabling the player to use the credit instrument to purchase goods or services with a portion of the monetary value of the anonymous account at a terminal other than a gaming terminal; and
    crediting the anonymous account with a predetermined percentage of a purchase separate from the gaming terminal for goods or services made with the credit instrument.

13. The method according to claim 12, further comprising enabling the player to access at least a portion of the monetary value with the device for reading the credit instrument of the gaming terminal.

14. The method according to claim 12, further comprising updating the monetary value with winnings from a result of the lottery-type wager.

15. The method according to claim 12, further comprising:
    providing the player a second opportunity to place the credit instrument in the device for reading the credit instrument of the gaming terminal to access the monetary value; and allowing the player to remove the credit instrument from the device for reading the credit instrument prior to enabling the player to place the lottery-type wager.

16. The method according to claim 12, further comprising:
selecting the credit instrument to be associated with the monetary value and with a second monetary account associated with a debit card account or a credit card account; and
enabling the player to transfer a portion of funds from the second monetary account to the monetary value.

17. A system for conducting a lottery-type gaming activity, comprising:
a gaming terminal associated with a device for reading a credit instrument;
at least one credit instrument associated with a monetary value, wherein the at least one credit instrument is readable by the device for reading the credit instrument; and
a network interface apparatus with associated software, wherein the software is operatively configured to enable the gaming terminal to:
enable a player to set up an anonymous account associated with a monetary value, the anonymous account withholding an identity of the player from the gaming administrator;
enable the player to place a lottery-type wager on a lottery-type event independent of the gaming terminal using the at least one credit instrument and the gaming terminal;
enable the player to use the credit instrument to purchase goods or services using a portion of the monetary value of the anonymous account at a terminal other than a gaming terminal; and
add funds to the anonymous account in response to the player making a purchase separate from the gaming terminal with the credit instrument.

18. A method of conducting a lottery-type gaming activity, the method comprising:
enabling a player to associate a credit instrument with an account of a financial institution and with an account of a lottery-type gaming system;
enabling the player to transfer funds between the account of the financial institution and the account of the lottery-type gaming system;
subsequent to a transfer of such funds, enabling the player to place a lottery-type wager with funds associated with the account of the lottery-type gaming system;
enabling the player to use the credit instrument to purchase goods or services with the funds associated with the account of the lottery-type gaming system at a terminal other than a gaming terminal; and
responsive to the player making a purchase separate from the gaming terminal with the account of the financial institution, adding funds to the account of the lottery-type gaming system.

19. The method according to claim 18, wherein enabling the player to transfer funds comprises providing an input device operatively connected to the lottery-type gaming system, wherein the input device is configured to read the credit instrument.

20. The method according to claim 18, further comprising selecting the credit instrument from the group consisting of a house card, a credit card, a smart card, a debit card, a bank card, a token card, an anonymous token card, a lottery-type gaming venue issued card, a voucher, an ATM card, a smart card account, a combination house card/credit/debit card, a token/debit card, a stored value card, a pre-owned instrument, a gift card, a cell phone, a personal digital assistant, and combinations of any thereof.

21. The method according to claim 18, further comprising associating the credit instrument with a marketing program such that, upon participation in the marketing program by the player, funds are credited to the account of the lottery-type gaming system.

22. A system for conducting a lottery-type gaming activity, comprising:
at least one gaming terminal having a credit instrument reader associated therewith;
at least one credit instrument configured for both association with an account of a financial institution and an account of a lottery-type gaming system, wherein the at least one credit instrument is readable by the credit instrument reader;
a network interface apparatus with associated software, wherein the software is operatively configured to enable the at least one gaming terminal to
enable a player to transfer funds between the account of the financial institution and the account of the lottery-type gaming system; and
enable the player to place a lottery-type wager on the at least one gaming terminal with funds from the account of the lottery-type gaming system, and wherein the software is configured to add funds to the account of the lottery-type gaming system in response to the player making a purchase separate from the gaming terminal with the at least one credit instrument and the funds of the account of the financial institution.

23. The system of claim 22, wherein the at least one credit instrument is selected from the group consisting of a house card, a credit card, a smart card, a debit card, a bank card, a token card, an anonymous token card, a lottery-type gaming venue issued card, a voucher, an ATM card, a smart card account, a combination house card/credit/debit card, a token/debit card, a stored value card, a pre-owned instrument, a gift card, a cell phone, a personal digital assistant, and combinations of any thereof.

24. The system of claim 22, wherein the software is further configured to associate the at least one credit instrument with a marketing program such that funds may be credited to the account of the lottery-type gaming system.

25. The system of claim 22, wherein the at least one credit instrument comprises a house account card provided to the player by a gaming administrator.

26. The system of claim 22, wherein the software is further configured to enable the player to use the at least one credit instrument to purchase goods or services with the funds of the account of the lottery-type gaming system.

27. A cashless method of lottery-type wagering comprising:
enabling a gaming administrator to provide a player with a credit instrument associated with a monetary account;
providing a gaming terminal configured for the player to place a lottery-type wager on a lottery-type event independent of the gaming terminal;
enabling the player to present the credit instrument to a card reader in communication with the gaming terminal;
enabling the player to access at least a portion of funds of the monetary account for use at the gaming terminal;
enabling the player to place a lottery-type wager at the gaming terminal using the at least a portion of the funds;
enabling the player to make a purchase using the credit instrument and at least another portion of the funds of the monetary account at a terminal independent of each gaming terminal provided by an establishment; and responsive to the player making a purchase separate from the gaming terminal, adding funds to the account.

28. The method according to claim 27, wherein making the purchase using the credit instrument is effected before placing the lottery-type wager.

29. The method according to claim 27, wherein making the purchase using the credit instrument is effected after placing the lottery-type wager.

30. The method according to claim 27, further comprising enabling the player to use the credit instrument to access a restricted-access area at a venue housing the gaming terminal.

31. The method according to claim 27, further comprising providing the player an opportunity to use the credit instrument to access an informational display associated with the gaming terminal.

32. The method according to claim 27, further comprising providing the player an opportunity to add additional funds to the monetary account.

33. The method according to claim 27, wherein enabling the player to access the at least a portion of funds comprises sending a request for allocation of the at least a portion of funds to a remote computer in communication with the card reader.

34. The method according to claim 33, wherein enabling the player to access the at least a portion of funds further comprises receiving the at least a portion of funds requested from an authorization sent to the gaming terminal from the remote computer.

35. The method according to claim 27, further comprising updating the monetary account with winnings from the result of the lottery-type wager.

36. The method according to claim 27, wherein the credit instrument is selected from the group consisting of a house card, a credit card, a smart card, a debit card, a bank card, a token card, an anonymous token card, a lottery-type gaming venue issued card, a voucher, an ATM card, a smart card account, a combination house card/credit/debit card, a token/debit card, a stored value card, a pre-owned instrument, a gift card, a cell phone, a personal digital assistant, and combinations of any thereof.

37. The method according to claim 27, further comprising selecting the credit instrument to have a predenominated amount of funds.

38. The method according to claim 27, further comprising requiring that the player remove the credit instrument prior to placing the lottery-type wager.

39. The method according to claim 27, further comprising verifying the identity of the player prior to the player obtaining the funds.

40. The method according to claim 39, further comprising using a personal identification number, a key, a smart card, an electronic button for entering a personal identification number in a user interface of the gaming terminal, a fingerprint imaging device, or a retinal scan to verify the identity of the player.

41. The method according to claim 27, wherein enabling the player to access the at least a portion of funds of the monetary account for use at the gaming terminal further comprises requesting a specific amount of funds as determined by the player.

42. The method according to claim 27, further comprising forwarding information regarding the outcome of the lottery-type wager over a communication link.

43. The method according to claim 42, wherein forwarding information comprises sending the information using text messaging or email.

44. The method according to claim 27, further comprising selecting the credit instrument to be associated with a first monetary account and with a second monetary account associated with a debit card account or credit card account issued by an entity independent of an establishment providing the gaming terminal, and using at least a portion of the funds from the first monetary account to place the lottery-type wager.

45. The method according to claim 44, further comprising crediting the first monetary account when a purchase is placed using funds from the second monetary account.

46. The method according to claim 44, further comprising selecting the funds from the first monetary account to be available for use at a venue at which the gaming terminal is located.

47. The method according to claim 44, further comprising transferring funds between the first monetary account and the second monetary account.

48. A cashless method of lottery-type wagering comprising:

enabling a player to input a unique identifier associated with a first monetary account over a communication link with a remote computer;

enabling the player to access at least a portion of funds from the first monetary account;

allowing the player to place a lottery-type wager over the communication link on an event using the at least a portion of the funds from the first monetary account; and crediting the first monetary account with a predetermined percentage of a purchase for goods or services offered by an entity separate from an administrator of the lottery-type wagering placed using funds from a second monetary account.

49. The method according to claim 48, further comprising enabling the player to purchase goods or services offered by the administrator of the lottery-type wagering over the communication link using at least another portion of the funds from the first monetary account.

50. The method according to claim 48, wherein enabling the player to input the unique identifier comprises inputting an account number using a touchtone telephone.

51. The method according to claim 49, further comprising enabling the player to input a unique secondary identifier number using the touchtone telephone.

52. The method according to claim 48, wherein enabling the player to place the lottery-type wager over the communication link comprises inputting the lottery-type wager using a touchtone telephone.

53. The method according to claim 48, wherein enabling the player to place the lottery-type wager over the communication link comprises inputting a code corresponding to a specific lottery-type gaming administrator.

54. The method according to claim 48, wherein enabling the player to input the unique identifier comprises inputting an account number into a user interface of a website that communicates with the remote computer.

55. The method according to claim 54, further comprising enabling the player to input a unique secondary identifier into the user interface of the website that communicates with the remote computer.

56. The method according to claim 48, further comprising enabling the player to purchase at least one item not associated with the lottery-type wagering.

57. The method according to claim 48, further comprising enabling the player to select the first monetary account to be associated with a credit instrument.

58. The method according to claim 57, further comprising enabling the player to add funds to the first monetary account associated with the credit instrument.

59. The method according to claim 57, further comprising selecting the credit instrument to have a predenominated amount of funds.

60. The method according to claim 48, further comprising updating the first monetary account with winnings from the result of the lottery-type wager.

61. The method according to claim 48, further comprising verifying the identity of the player prior to the player obtaining the funds from the first monetary account.

62. The method according to claim 57, further comprising selecting the credit instrument from the group consisting of a house card, a credit card, a smart card, a debit card, a bank card, a token card, an anonymous token card, a lottery-type gaming venue issued card, a voucher, an ATM card, a smart card account, a combination house card/credit/debit card, a token/debit card, a stored value card, a pre-owned instrument, a gift card, a cell phone, a personal digital assistant, and combinations of any thereof.

63. The method according to claim 57, further comprising enabling the player to associate the second monetary account with a debit card account or credit card account.

64. The method according to claim 63, further comprising enabling the administrator to provide the player with the credit instrument.

65. The method according to claim 63, further comprising selecting the funds from the first monetary account to be only available for use in placing a lottery-type wager.

66. The method according to claim 63, further comprising transferring funds between the first monetary account and the second monetary account.

* * * * *

UNITED STATES PATENT AND TRADEMARK OFFICE
CERTIFICATE OF CORRECTION

PATENT NO. : 8,128,485 B2
APPLICATION NO. : 11/223217
DATED : March 6, 2012
INVENTOR(S) : Kenneth A. Vlazny et al.

It is certified that error appears in the above-identified patent and that said Letters Patent is hereby corrected as shown below:

COLUMN 8, LINE 61, change "balance, and" to --balance and,--

CLAIM 11, COLUMN 20, LINE 36, change "monetary" to --anonymous--

Signed and Sealed this
Second Day of April, 2013

Teresa Stanek Rea
*Acting Director of the United States Patent and Trademark Office*